US010474776B2

(12) United States Patent
Kusumoto et al.

(10) Patent No.: US 10,474,776 B2
(45) Date of Patent: Nov. 12, 2019

(54) PIPE NETWORK ANALYSIS APPARATUS, PIPE NETWORK ANALYSIS METHOD, AND STORAGE MEDIUM

(71) Applicant: NEC Corporation, Tokyo (JP)

(72) Inventors: Manabu Kusumoto, Tokyo (JP); Yuichi Nakamura, Tokyo (JP); Takahiro Kumura, Tokyo (JP)

(73) Assignee: NEC Corporation, Tokyo (JP)

( * ) Notice: Subject to any disclaimer, the term of this patent is extended or adjusted under 35 U.S.C. 154(b) by 185 days.

(21) Appl. No.: 15/520,781

(22) PCT Filed: Oct. 20, 2015

(86) PCT No.: PCT/JP2015/005275
§ 371 (c)(1),
(2) Date: Apr. 20, 2017

(87) PCT Pub. No.: WO2016/067559
PCT Pub. Date: May 6, 2016

(65) Prior Publication Data
US 2017/0308635 A1 Oct. 26, 2017

(30) Foreign Application Priority Data
Oct. 29, 2014 (JP) .................. 2014-220312

(51) Int. Cl.
*G06F 17/50* (2006.01)
*G06F 17/13* (2006.01)
(52) U.S. Cl.
CPC .......... *G06F 17/5036* (2013.01); *G06F 17/13* (2013.01); *G06F 17/50* (2013.01);
(Continued)

(58) Field of Classification Search
CPC ............. G06F 17/5009; G06F 17/5036; G06F 2217/16; G06F 2217/34
(Continued)

(56) References Cited

U.S. PATENT DOCUMENTS

| 4,694,411 | A | * | 9/1987 | Burrows | ............. | G06F 17/5009 |
| | | | | | | 703/14 |
| 4,725,970 | A | * | 2/1988 | Burrows | ............. | G06F 17/5009 |
| | | | | | | 703/14 |

(Continued)

FOREIGN PATENT DOCUMENTS

| JP | S59-106823 A | 6/1984 |
| JP | S63-271573 A | 11/1988 |

(Continued)

OTHER PUBLICATIONS

International Search Report corresponding to PCT/JP2015/005275, 2 pages, dated Jan. 19, 2016, 2 pages.

(Continued)

*Primary Examiner* — Thai Q Phan
(74) *Attorney, Agent, or Firm* — Wilmer Cutler Pickering Hale and Dorr LLP

(57) ABSTRACT

An apparatus, method and the like which enables to represent a pipe network transporting a fluid by use of electrical circuit network is provided. The pipe network analysis apparatus includes; processing circuitry configured to receive a pipe network model that represents a pipe network being constituted by one or more piping elements, convert at least one piping element to an element of an electric circuit being configured to represent a non-linear relation between a pressure and a flow rate of the fluid in the piping elements by use of a relation between a voltage and a current, and generate a model representing an electric circuit network expressing the pipe network, by use of the element of the (Continued)

electric circuit; and an output device configured to provide the model analyzable by a specific electric circuit simulator.

16 Claims, 28 Drawing Sheets

(52) U.S. Cl.
CPC ........ *G06F 17/5009* (2013.01); *G06F 17/509* (2013.01); *G06F 2217/16* (2013.01); *G06F 2217/34* (2013.01); *G06F 2217/36* (2013.01)

(58) Field of Classification Search
USPC .................................................. 703/2, 6, 19
See application file for complete search history.

(56) References Cited

U.S. PATENT DOCUMENTS

| | | | | |
|---|---|---|---|---|
| 9,395,535 | B2* | 7/2016 | Schneider | G02B 26/06 |
| 9,746,985 | B1* | 8/2017 | Humayun | G06Q 10/10 |
| 2007/0145745 | A1* | 6/2007 | Woods | F01P 3/00 |
| | | | | 290/1 A |
| 2013/0310995 | A1* | 11/2013 | Koeneman | F01P 3/00 |
| | | | | 700/291 |
| 2015/0323781 | A1* | 11/2015 | Schneider | G02B 26/06 |
| | | | | 359/238 |
| 2016/0252422 | A1* | 9/2016 | Howitt | E03B 7/071 |
| | | | | 73/40.5 A |
| 2017/0168034 | A1* | 6/2017 | Fenton | G01N 33/0036 |

FOREIGN PATENT DOCUMENTS

| | | | |
|---|---|---|---|
| JP | H09-297604 | A | 11/1997 |
| JP | H10-320444 | A | 12/1998 |
| JP | 2000-310398 | A | 11/2000 |
| JP | 2001-249706 | A | 9/2001 |
| JP | 2002-073123 | A | 3/2002 |
| JP | 2008-058109 | A | 3/2008 |
| JP | 2008-236270 | A | 10/2008 |

OTHER PUBLICATIONS

Written Opinion of International Searching Authority of PCT/JP2015/005275, 10 pages, dated Jan. 19, 2016.

Masashi Shimada, "A Numerical Analysis Method for a Gradual Transient Phenomenon of a Pipe Line in a Stiffness Model and Valve Complete Closure", Collection of papers of the Journal of the Agricultural Engineering Society, The Japanese Society of Irrigation, Drainage and Rural Engineering, 1998, No. 136. pp. 83-90.

Toshio Ohono et al., Simulation of Pipe Networks by Electrical Dualog Networks, Proceedings of the Japan Society of Civil Engineers, [online], Jul. 1976, No. 251, pp. 59-64, [retrieved on Jan. 6, 2016], Retrieved from the Internet: <<URL:https://www.jstage.jst.go.jp/article/jscej1969/1976/251/1976_251_59/_article/references/_char/ja/>><DOI: 10.2208/jscej1969.1976.251_59>.

Makoto Shimojo, Sign Analysis of a Mechanical Circuit [online], Aug. 2010, pp. 1-88 (89 total pages), [retrieved on Jan. 6, 2016], Retrieved from the Internet: <URL:http://www.rm.mce.uec.ac.jp/lecture/mech/MechCircuitMatrix.pdf>.

* cited by examiner

Fig. 1

| WATER NETWORK | ELECTRIC CIRCUIT |
|---|---|
| $\dfrac{\partial H}{\partial x_1}$ | $\dfrac{\partial v}{\partial x_2}$ |
| $\dfrac{1}{g}\dfrac{\partial V}{\partial t_1}$ | $L\dfrac{\partial i}{\partial t_2}$ |
| $\dfrac{f(V)}{2gD}V$ | $Ri$ |
| $\dfrac{\partial V}{\partial x_1}$ | $\dfrac{\partial i}{\partial x_2}$ |
| $\dfrac{g}{a^2}\dfrac{\partial H}{\partial t_1}$ | $C\dfrac{\partial v}{\partial t_2}$ |

Fig. 8

```
.param highimp=1e8 lowimp=highimp*1e-10
.subckt pipeHW n001 N003 n002 L=100 D=1 R=100 ML=0
L1 n001 N003 {Ind}
R2 n002 N004 {lowimp}
Bq N003 N004 V=I(Bq)*abs(I(Bq))**0.852*10.667*R**-1.852*D**-4.871*L
C1 n001 0 {Cap/2}
R1a n001 0 {highimp}
C2 n002 0 {Cap/2}
R1b n002 0 {highimp}
.param pi=3.14159265 Ap=pi*(D/2)**2 g=9.80665 a=1000 Cap=L/a**2*g*Ap Ind=L/(g*Ap)
.ends pipeHW
```

Fig. 13

```
.subckt valvemodel n1 n2 Kc
R4 0 Kc 1
R3 n1 0 1meg
Bv n1 n2 V=I(Bv)*abs(I(Bv))*V(Kc)/div
.param A=pi*(D/2)**2 g=9.80665 div=2*g*A**2
.ends valvemodel
```

Fig. 15

```
.subckt accumulatormodel n1 ng
C3 n1 ng {Cs}
Bacc n1 ng I=Cd*uramp(V(n1,ng)-h)**1.5
R1 n1 ng 1meg
.ends accumulatormodel
```

Fig. 21

```
.subckt pumpmodelsp n001 n002 A=1 B=1 C=2
B1 n001 n003 V=(-A+B*(I(B1))**C)
R1 n003 n002 {lowimp}
.ends pumpmodelsp
```

Fig. 22

```
.subckt tankmodel n001 n002 Elev=0 Cap=10 Init=0 MinLevel=0 MaxLevel=100
Bsw n001 nC I=if((V(n001,nC)>=0 & V(nC,nelev)>=MaxLevel) | (V(n001,nC)<=0
    & V(nC,nelev)<=MinLevel), V(n001,nC)/highSw, V(n001,nC)/lowSw)
C1 nC nelev [Cap] IC=[Init]
V1 nelev n002 [Elev]
Rcap nC nelev {highimp}
Rbuf n001 nC {highimp}
.ends tankmodel
```

Fig. 23

VP1 p1 0 DC 1.0 PWL( 0,1.0    7200,1.2  14400,1.4    21600,1.6
                     28800,1.4          36000,1.2    43200,1.0
                     50400,0.8          57600,0.6    64800,0.4
                     72000,0.6          79200,0.8    86400,1.0 )

PIPE NETWORK ANALYSIS APPARATUS, PIPE NETWORK ANALYSIS METHOD, AND STORAGE MEDIUM

CROSS-REFERENCE TO RELATED APPLICATIONS

This application is a national stage application of International Application No. PCT/JP2015/005275 entitled "PIPE NETWORK ANALYSIS DEVICE, PIPE NETWORK ANALYSIS METHOD, AND STORAGE MEDIUM IN WHICH COMPUTER PROGRAM IS RECORDED," filed on Oct. 20, 2015, which claims the benefit of the priority of Japanese Patent Application No. 2014-220312 filed on Oct. 29, 2014, the disclosures of each of which are hereby incorporated by reference in their entirety.

TECHNICAL FIELD

The present invention relates to an analysis apparatus and the like capable of analyzing a pipe network that transports fluid of a water pipe or the like.

BACKGROUND ART

In recent years, there is a demand for a technology for appropriately managing a pipe network that transports fluid such as a gas transporting network, a water and sewage pipe network, and the like, and the fluid transported by the pipe network.

For example, in a water pipe network, there is a demand for monitoring a water distributing pipe (a pipe-shaped fluid pipe, hereinafter referred to as a "pipe" in some cases), various types of valves, a tank, and the like that are elements constituting the water pipe network, and thereby managing these elements appropriately (piping management). The piping management includes, for example, prevention of failures (breakage and the like) in elements constituting a pipe network and measures against deterioration.

Further, in a water pipe network, for example, it is necessary to appropriately control water distribution by monitoring a state of fluid (e.g. water quantity and water pressure). The water distribution control includes, for example, prevention for breakage of a pipe network due to a sudden water pressure variation, maintenance of an appropriate water pressure at a water supply point, and treatment for a rapid change of a water supply quantity or a demand quantity.

For the piping management or water distribution control, there is a demand for a technology capable of analyzing elements (e.g. pipes, tanks, and valves) configuring a pipe network and a state of fluid transported by the pipe network.

As one example, it is possible to monitor elements constituting a pipe network or a state of fluid transported by the pipe network, by arranging various types of sensors for a pipe network. However, installation of a large number of sensors for a large-scale pipe network may not always realistic from the viewpoint of cost and installation man-hour. In this case, it is desirable that a pipe network or fluid transported by the pipe network is represented using an appropriate model, and the model is analyzable using a simulation technique or the like.

As one technique for analyzing a pipe network and fluid transported by the pipe network as described above, there is a known technique for modeling a pipe network and performing simulation therefor.

For example, as simulators for modeling a water pipe network, a software program referred to as EPANET ([searched in the Internet on Sep. 24, 2014], <URL:http://www.epa.gov/nrmrl/wswrd/dw/epanet.html>) developed in United States Environmental Protection Agency and EPANET 2 are known.

As a technique for analyzing a model in which a pipe network of water is modeled, for example, a technique disclosed in following NPL 1 is known. NPL 1 discloses a method for representing a water pipe network as a model on the basis of connection information of a pipe, and analyzing an unsteady flow in the water pipe network using a stiffness model in which elasticity of water and a pipe material is not concerned.

Further, regarding a technique for analyzing a pipe network, the following techniques have been disclosed.

PTL 1 (Japanese Laid-open Patent Publication No. 2000-310398) discloses a technique for analyzing a residence time of fluid in a piping. The analysis system disclosed in PTL 1 calculates a flow rate distribution at a specific time on the basis of a supply pressure and a supply flow rate of fluid actually measured using a sensor and pipe network data stored in a database.

PTL 2 (Japanese Laid-open Patent Publication No. H10 (1998)-320444) discloses a technique for transiently analyzing a change of a current or voltage in each node in a non-linear circuit network corresponding to a water pipe network and thereby analyzing a flow rate in the water pine network. The analysis method disclosed in PTL 2 associates a flow rate and a loss (pressure loss) of water in a water pipe with a current and a voltage in an electric circuit, respectively. In addition, the analysis method provides a virtual capacitor in each node, represents a pipe as a non-linear element, and thereby replaces a water pipe network with an electric circuit network. The analysis method calculates a flow rate in each node using a dedicated calculation program (computer program) for solving a node equation in an electric circuit network replaced from a water pipe network.

PTL 3 (Japanese Laid-open Patent Publication No. S59 (1984)-106823) discloses a technique relating to an analog line simulation apparatus (simulator) that performs analysis of traveling wave on a line. In order to analyze a behavior of the traveling wave (e.g. a water hammer in a water pipe or a lightning surge in a power transmission line) propagating on a line, the apparatus disclosed in PTL 3 represents a wave equation of the traveling wave by use of a model constituted by an analog circuit element (hardware).

While not directly related to a technique for analyzing a pipe network, the following techniques have been disclosed. That is, a technique for generating a ladder diagram used for controlling a programable logic controller from specific model data (e.g. a design drawing) is disclosed in PTL 4 (Japanese Laid-open Patent Publication No. 2001-249706) and PTL 5 (Japanese Laid-open Patent Publication No. 2002-073123). A technique for obtaining a state equation for a control target based on observation data or a model is disclosed in PTL 6 (Japanese Laid-open Patent Publication No. 2008-236270) and PTL 7 (Japanese Laid-open Patent Publication No. H9(1997)-297604). A technique for estimating observation data in a specific observant point on the basis of observation data in a different observation point, is disclosed in PTL 8 (Japanese Laid-open Patent Publication No. 2008-058109).

CITATION LIST

Patent Literature

[PTL 1] Japanese Laid-open Patent Publication No. 2000-310398
[PTL 2] Japanese Laid-open Patent Publication No. H10 (1998)-320444
[PTL 3] Japanese Laid-open Patent Publication No. S59 (1984)-106823
[PTL 4] Japanese Laid-open Patent Publication No. 2001-249706
[PTL 5] Japanese Laid-open Patent Publication No. 2002-073123
[PTL 6] Japanese Laid-open Patent Publication No. 2008-236270
[PTL 7] Japanese Laid-open Patent Publication No. H9(1997)-297604
[PTL 8] Japanese Laid-open Patent Publication No. 2008-058109

Non Patent Literature

[NPL 1] Masashi Shimada, "A Numerical Analysis Method for a Gradual Transient Phenomenon of a Pipe Line in a Stiffness Model and Valve Complete Closure", Collection of papers of the Journal of the Agricultural Engineering Society, The Japanese Society of Irrigation, Drainage and Rural Engineering, 1998, No. 136. pp 83-90

SUMMARY OF INVENTION

Technical Problem

The technique disclosed in above NPL 1 creates a model theoretically representing a water pipe network of an analysis target. To analyze a state of a water pipe network on the basis of the theory, it is necessary to create a model for each water pipe network of the analysis target respectively and execute numerical calculation. This is equivalent to development of a simulator for each water pipe network of an analysis target. In addition, the technique disclosed in above NPL 1 is mainly focused on a gradual transient phenomenon in a pipe network as a analysis target, and therefore a different model is needed for a rapidly changing phenomenon, on the basis of a different theory.

The technique disclosed in above PTL 1 is a technique for calculating only a flow rate at a specific time on the basis of an actually measured value obtained by a sensor and pipe data. That is, an analysis for a target other than the flow rate is not described in the PTL 1. Further, the technique disclosed in above PTL 1 needs the actually measured value obtained by the sensor, and therefore it is necessary to install the sensor for the pipe network.

The technique disclosed in above PTL 2 is a technique for developing a dedicated calculation program for executing computation for a specific electric circuit model which can replace a water pipe network, and for analyzing a state of the water pipe network by use of the program. In other words, the technique disclosed in above PTL 2 requires a dedicated calculation program.

The technique disclosed in above PTL 3 is a technique for representing a formulated wave equation using a model including an analog circuit (hardware). In the technique disclosed in above PTL 3 does not describes a specific method for creating a model representing each element (a water pipe and the like) constituting a pipe network such as a water pipe network and the like, and a model representing a state of fluid. In addition, the technique disclosed in above PTL 3 uses the analog circuit being specific hardware, and therefore it is necessary to create a large-scale circuit, depending on the scale of an analysis target. Therefore, it may be difficult to apply the technique disclosed in above PTL 3 to analysis of a large-scale pipe network.

In addition, in the technique disclosed in each literature described above, it is necessary to create each dedicated simulator in accordance with each pipe network as an analysis target, or a state as an analysis target (e.g. analysis of a steady state or analysis of a transient state) in the pipe network.

Creating the simulator may need a lot of costs, and it is not easy to develop a simulator having sufficient analysis performance (e.g. a time necessary for analysis and analyzable contents). Therefore, a technique capable of analyzing a state of fluid in a pipe network without providing a dedicated simulator for each analysis target has been desired.

The present invention has been made in view of the above-described circumstances. A main object of the present invention is to provide a pipe network analysis apparatus or the like that analyzes a pipe network that transports fluid using by use of a technique for analyzing an electric circuit network, by representing the pipe network using the electric circuit network according to characteristics of the fluid.

Solution to Problem

To achieve above described objective, a pipe network analysis apparatus according to one aspect of the present invention is configured as follows. That is, the pipe network analysis apparatus according to one aspect of the present invention includes processing circuitry and an output device. The processing circuitry is configured to receive a pipe network model that represents a pipe network that transports a fluid, the pipe network being constituted by one or more piping elements, convert at least one piping element of the piping elements to an element of an electric circuit, the element being configured to represent a non-linear relation between a pressure and a flow rate of the fluid in the piping elements by use of a relation between a voltage and a current, and generate a model representing an electric circuit network expressing the pipe network, by use of the element of the electric circuit being converted. The output device is controlled by the processing circuitry, and configured to provide the model being generated as a model analyzable by a specific electric circuit simulator.

A pipe network analysis method according to one aspect of the present application includes following configurations. That is, the pipe network analysis method according to one aspect of the present application includes receiving a pipe network model that represents a pipe network that transports fluid, the pipe network being constituted by one or more piping elements, converting at least one piping element of the piping elements to an element of an electric circuit, the element being configured to represent a non-linear relation between a pressure and a flow rate of the fluid in the piping elements by use of a relation between a voltage and a current, and generating a model representing an electric circuit network expressing the pipe network, by use of the element of the electric circuit being converted.

Further, the objective is also achieved by a computer program for realizing a pipe network analysis apparatus including the configuration and a corresponding pipe network analysis method by use of a computer, a computer-readable storage medium storing the computer program, and the like.

Advantageous Effects of Invention

According to the present invention, a pipping network that transports fluid is represented by use of an electric circuit network in accordance with characteristics of the fluid, and thereby the pipe network can be analyzed using a technique for analyzing the electric circuit network.

BRIEF DESCRIPTION OF DRAWINGS

FIG. 1 is a diagram illustrating a correspondence between a motion equation and a continuity equation of fluid and a telegraphy equation in an electric circuit.

FIG. 8 is a diagram illustrating an electric circuit representing a water pipe (pipe) in a format analyzable by a specific electric circuit simulator.

FIG. 13 is a diagram illustrating an electric circuit representing a valve, in a format analyzable by a specific electric circuit simulator.

FIG. 15 is a diagram representing an electric circuit representing a surge tank in a format analyzable by a specific electric circuit simulator.

FIG. 21 is a diagram representing an electric circuit representing a pump in a format analyzable by a specific electric circuit simulator.

FIG. 22 is a diagram representing an electric circuit representing a tank in a format analyzable by a specific electric circuit simulator.

FIG. 23 is a diagram representing an electric circuit representing a pattern of changes water pressure at a node in a water pipe network in a format analyzable by a specific electric circuit simulator.

DESCRIPTION OF EMBODIMENTS

Figure 2:
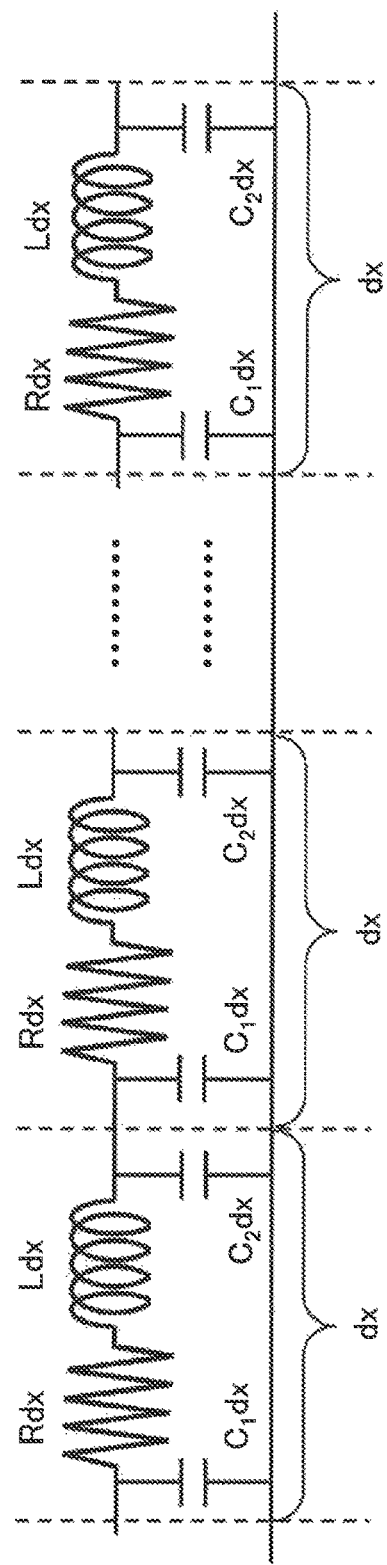
FIG. 2 is a diagram conceptually representing a configuration of a distributed constant circuit using a ladder circuit.

In the following, example embodiments of the present invention will be described in detail with reference to the accompanying drawings. Configurations described in the following example embodiments are merely illustrative examples, and the technical scope of the present invention is not limited thereto.

A pipe network analysis apparatus described below in each example embodiment may be realized by a dedicated hardware apparatus. Alternatively, the pipe network analysis apparatus may be configured as a system in which one or more elements constituting the pipe network analysis apparatus are realized using one or more physical or logical information processing apparatuses (physical computers, virtual computers, or the like).

Prior to description of each example embodiment of the present invention, to make the example embodiments of the present invention easily understood, a technical background and problems relating to the present invention will be described in detail.

In the following description, as a pipe network that transports fluid, a water pipe network that transports (distributes) water will be described as a specific example.

However, the present invention, described by using the present example embodiment as an example, is not limited thereto, and is applicable to a pipe network that transports any fluid other than water. The fluid may be liquid or gas.

First, a relation between a water pipe network and an electric circuit (electric circuit network) will be described. As described above, generally, to analyze a water pipe network, a simulator dedicated to the water pipe network is used. In contrast, in the present invention described by using the following example embodiments, similarity between characteristics of water as fluid and characteristics of electricity, is focused. Thereby, in the following example embodiments, a water pipe network is represented by a model using an electric circuit network. In other words, in the following example embodiments, similarity between a water flow (a flow rate of water) and a current, and similarity between a water pressure and a voltage are considered. Thereby it is possible to represent the water pipe network with the model using the electric circuit network.

However, characteristics of water and characteristics of electricity are not exactly the same. Therefore, to represent the water pipe network by the electric circuit network, it is necessary to constitute the electric circuit network by use of appropriate elements (circuit elements or the like) in accordance with characteristics of fluid (water) different from those of electricity.

When the water pipe network is represented using the electric circuit network, each element (piping element) constituting the water pipe network is represented using a circuit element constituting the electric circuit network. The circuit element is configured by combining one or more circuit element devices.

A state of water (a flow rate, a water pressure, and the like) in each element (e.g. a water pipe (pipe), a valve, various types of tanks, and a pump) constituting a water pipe network may non-linearly change, for example, in accordance with a flow rate (or a flow velocity) or a water pressure of the piping element. In the element constituting the water pipe network, a non-linear relation is satisfied between a pressure and a flow rate of the fluid, in accordance with characteristics of fluid (water).

Therefore, to represent each element constituting the water pipe network (represented as a model) by a circuit element, an electric circuit model able to represent a non-linear change of a current or voltage in a certain circuit element is needed. In this case, it is suitable to use a circuit element (referred to as a "non-linear element" in some cases) that non-linearly changes the voltage or current in the certain circuit element in accordance with a voltage or current in a specific portion included in an electric circuit network. In the following example embodiments, a method for representing a water pipe network as a model by replacing the water pipe network with an electric circuit network, by use of circuit elements including the non-linear element, will be described.

Using a water pipe (pipe) as a specific example, similarity between characteristics of water and characteristics of electricity will be described referring to equations representing the respective characteristics. First, an equation that formulates characteristics of water will be described. A motion equation in a water pipe (pipe) and a continuity equation of fluid (water) are represented by, for example, equation (1) and equation (2), respectively.

$$\frac{\partial H}{\partial x_1} + \frac{1}{g}\frac{\partial V}{\partial t_1} + \frac{f(V)}{2gD}V + \frac{1}{g}\frac{\partial V}{\partial x_1}V = 0 : \text{motion equation} \quad (1)$$

$$\frac{\partial V}{\partial x_1} + \frac{g}{a^2}\frac{\partial H}{\partial t_1} + \frac{g}{a^2}\left(\frac{\partial H}{\partial x_1} + \sin\gamma\right)V = 0 : \text{continuity equation} \quad (2)$$

where,
$x_1$: a position (distance) from an end of a pipe,
$t_1$: time,
H: a water head
g: a gravity acceleration,
V: a flow velocity of water,
f(V): a pressure loss,
D: a diameter of a water pipe,
a: a pressure propagation velocity (a sound velocity in water) in a water pipe,
γ: a slope of a pipe.

The pressure loss is generally represented as a function of flow rate (or flow velocity). On the other hand, when a transmission line of electricity is represented as a distributed constant circuit, a telegraphic equation is represented by equation (3) and equation (4).

$$\frac{\partial v}{\partial x_2} + L\frac{\partial i}{\partial t_2} + Ri = 0 \quad (3)$$

$$\frac{\partial i}{\partial x_2} + C\frac{\partial v}{\partial t_2} + Gv = 0 \quad (4)$$

where:
v: a voltage
i: a current,
R: a resistance per unit length in a transmission line (distributed constant circuit),
C: a capacitance per unit length in the transmission line (distributed constant circuit),
L: an inductance per unit length in the transmission line (distributed constant circuit),
G: a conductance per unit length in the transmission line (distributed constant circuit),
$x_2$: a position (a distance from a circuit end) in the distributed constant circuit,
$t_2$: time.

When the flow velocity "V" of water in a water pipe is sufficiently smaller than the pressure propagation velocity "a" (i.e. a Mach number is sufficiently smaller than 1), the following terms in above equations (1) and (2) may be ignored. In other words, the following terms in above equations (1) and (2) can be approximated to 0 (zero).

$$\frac{1}{g}\frac{\partial V}{\partial x_1}$$

in equation (1) and $$\frac{g}{a^2}\left(\frac{\partial H}{\partial x_1} + \sin\gamma\right)V$$

in equation (2).

A term relating to the conductance component "G" in equation (4) may be approximated to 0 by assuming "G=0" is satisfied.

As described above, when each of the terms is ignored (approximated to 0), the respective terms of equation (1) to equation (4) may be associated with each other as exemplarily illustrated in FIG. 1. In this case, the flow velocity in the water pipe network is associated with a current in the electric circuit network, and a water head (water pressure) in the water pipe network is associated with a voltage in the electric circuit network. In general, the water head and the water pressure are convertible to each other by multiplying a specific coefficient (a coefficient obtained by adding a density of water and a gravity acceleration). Thereby, the water pressure in the water pipe network can be associated with the voltage in the electric circuit network. In the water pipe network, a flow velocity (e.g. "V" in above equation (1)) and a cross-section area of a water pipe are multiplied and thereby the flow rate is obtained. Thereby, the flow rate of the water pipe network and a current in the electric circuit network can be also associated with each other.

A term relating to the pressure loss in motion equation (1) of a water pipe is generally represented by a function of flow velocity (or flow rate) and is non-linearly changed in accordance with the flow velocity "V". In other words, in the water pipe, due to characteristics of fluid (water), the pressure loss is non-linearly changed in accordance with the flow velocity (or flow rate) of the fluid. To represent a water pipe (pipe), it is necessary to use a circuit element capable of expressing characteristics of the fluid (water).

When the term relating to the pressure loss in above equation (1) is represented using a circuit element capable of expressing a non-linear relation between a voltage (equivalent to the pressure loss) and a current (equivalent to the flow rate), it is possible to create a model representing a water pipe by use of the electric circuit network. That is, by use of the circuit element capable of expressing the non-linear relation between a pressure loss (pressure) and a flow rate in a water pipe as a relation between a voltage and a current, the water pipe network can be represented as a model using the electric circuit network.

More specifically, when a water pipe network is represented as a model using an electric circuit network, a term in a telegraphic equation corresponding to a term relating to a pressure loss in the water pipe network, is represented using a non-linear element (non-linear resistance) "R" that is non-linearly changed with respect to a voltage or current. Thereby, according to a relation between equation (1) and equation (2) and equation (3) and equation (4), a water pipe (pipe) can be replaced with a transmission circuit and represented by the transmission circuit (distributed constant circuit). Details of a non-linear element in an electric circuit network will be described later.

Here, a case where a simulator having sufficient analysis performance for a specific analysis target other than a pipe network is applied to analysis of a pipe network is assumed. In this case, it is considered that a state of fluid in a pipe network can be analyzed using the simulator. As described above, when a water pipe is replaced with a transmission circuit, a water pipe network can be represented as a model using an electric circuit network. For the electric circuit network, a simulator (electric circuit simulator) with sufficient analysis performance is available. As such an electric circuit simulator, for example, various types of SPICE (Simulation Program with Integrated Circuit Emphasis) are applicable.

Hereinafter, a method for replacing elements constituting a water pipe network with circuit elements constituting an electric circuit network, and thereby replacing the water pipe network with the electric circuit network which can be analyzed by an electric circuit simulator will be specifically described.

[First Example Embodiment]

A first example embodiment of the present invention will be described. In the following description, first, a method for representing a water pipe (pipe) using an electric circuit will be described. It is assumed that in specifications of a water pipe (pipe) to be described below, a cross-section area is "A", a pipe length is "l", a pipe diameter is "D", and a pressure loss is "f(V)".

As described above, when non-linear elements are used for circuit elements constituting an electric circuit, a water pipe (pipe) can be represented using the electric circuit. More specifically, as exemplarily illustrated in FIG. 1, according to relation between above equation (1) and equation (2) relating to a water pipe (pipe), and above equation (3) and equation (4) relating to an electric circuit, a water pipe (pipe) can be represented as a distributed constant circuit.

It is considered that the distributed constant circuit is equivalent to a ladder circuit in which small LCR circuits of a line length dx are connected in a ladder form, as exemplarily illustrated in FIG. 2. "R" represents a resistance per unit length in a distributed constant circuit. "C" represents a capacitance per unit length in the distributed constant circuit. "L" represents an inductance per unit length in the distributed constant circuit. In accordance with terms approximated to 0 in equation (1) and equation (2) in a water pipe, a conductance component "G" is treated as 0. "C1" and "C2" in a small LCR circuit exemplarily illustrated in FIG. 2 are capacitors (capacitance elements) connected in parallel so that a combined capacitance becomes "C".

In general, when a line length of a distributed constant circuit is sufficiently shorter than a wavelength of a voltage (current) flowing in a line, the distributed constant circuit can be represented as a lumped constant circuit including a finite number of circuit elements.

Figure 3:
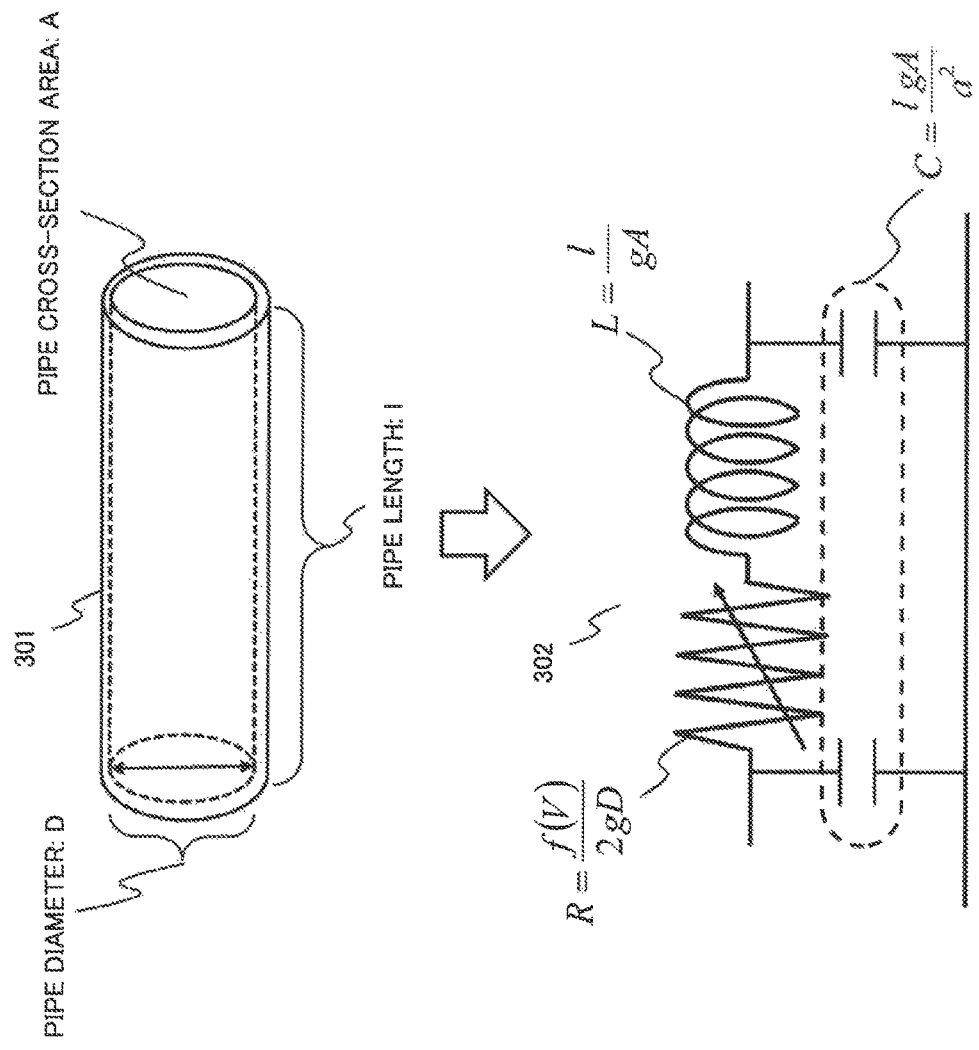
FIG. 3 is a diagram exemplarily illustrating a conceptual correspondence between a water pipe (pipe) and an electric circuit.

In this case, as exemplarily illustrated in FIG. 3, one water pipe (pipe) 301 can be associated with an electric circuit 302 (LCR electric circuit). In other words, one water pipe (pipe) 301 can be replaced with the electric circuit 302 and represented by the electric circuit 302. "L", "C", and "R" in the electric circuit 302 replaced from the water pipe (pipe) 301 is represented by the following equation (5) by referring to specifications of an original water pipe. In the following equation (5), a flow velocity in equation (1) and equation (2) is changed to a flow rate by multiplying a cross-section area "A" of the water pipe.

$$L = \frac{l}{gA}, C = \frac{lgA}{a^2}, R = \frac{f(V)}{2gD} \quad (5)$$

where:
g: a gravity acceleration,
A: a pipe cross-section area,
l: a pipe length,
V: a flow velocity of water,
D: a diameter of a pipe,
f(V): a pressure loss.

"R" in the electric circuit 302 is a non-linear element capable of representing a non-linear relation between a flow rate and a pressure (pressure loss) in the water pipe 301. More specifically, "R" in the electric circuit 302 is realized using a non-linear resistance which can change a resistance value non-linearly in accordance with a current in the electric circuit 302.

Figure 4:
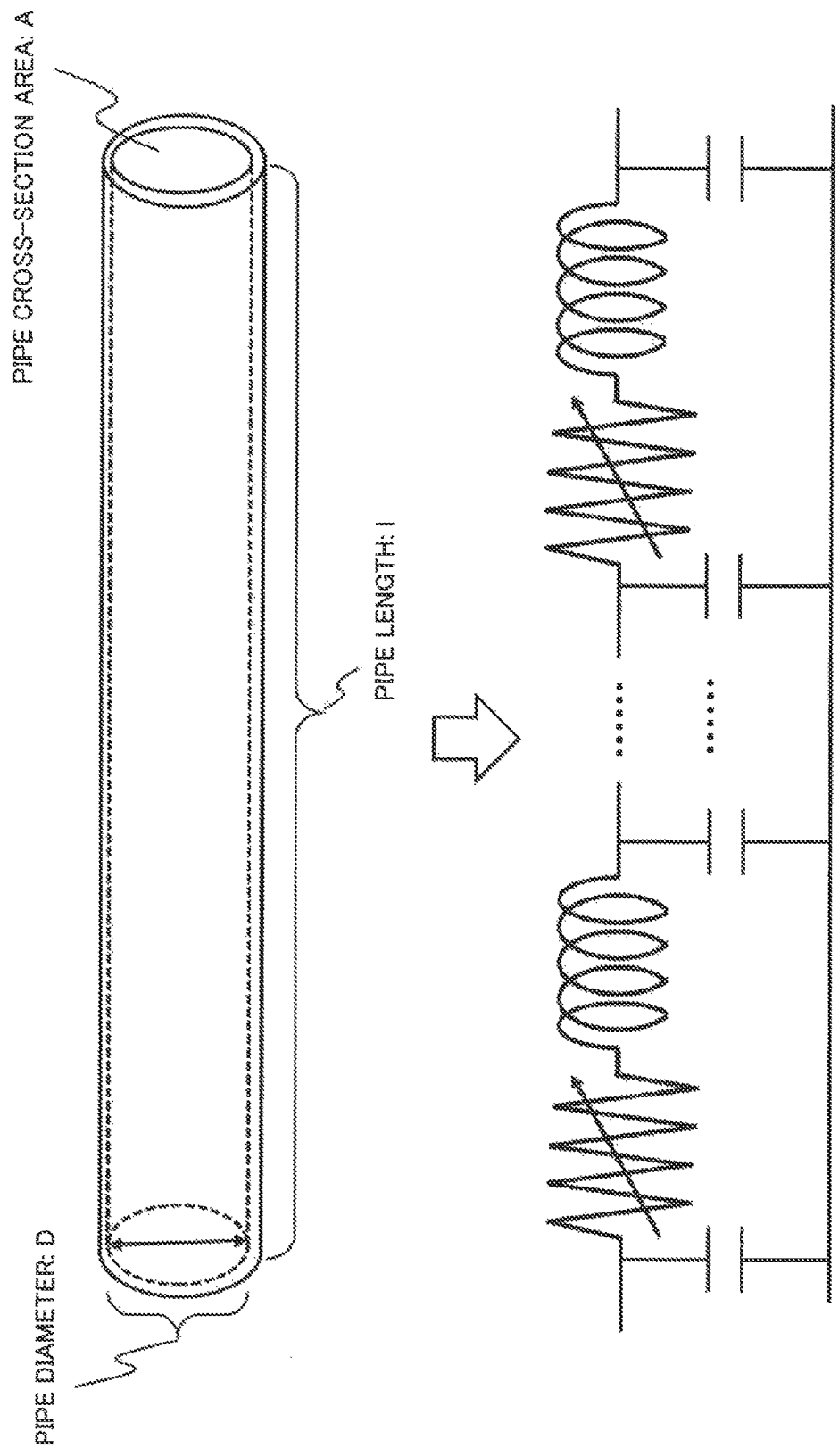
FIG. 4 is a diagram exemplarily illustrating a conceptual correspondence between a water pipe (pipe) and an electric circuit.

In the specific example exemplarily illustrated in FIG. 3, as an electric circuit representing one water pipe (pipe), one LCR circuit is exemplarily illustrated, but the present example embodiment is not limited thereto. One water pipe (pipe) can be replaced with a circuit in which a plurality, i.e. any number equal to or more than two of LCR circuits are connected (e.g. FIG. 4). In this case, a number of LCR circuits representing one water pipe (i.e. a number of segments into which a distributed constant circuit is divided) is appropriately selected.

A line length of one LCR circuit may be determined, for example, on the basis of a frequency of a voltage or current to be analyzed (corresponding to a pressure loss (loss water head) or a water quantity in an original water pipe (pipe)) or a rise rate of a waveform. More specifically, for example, a line length of one LCR circuit may be divided into "1/10" ("/" represents a fraction, the same in following) or less of a frequency of a voltage or current to be analyzed as an electric circuit. The line length of the LCR circuit is not limited to the above and is appropriately selected in accordance with necessary analysis accuracy.

Figure 5:
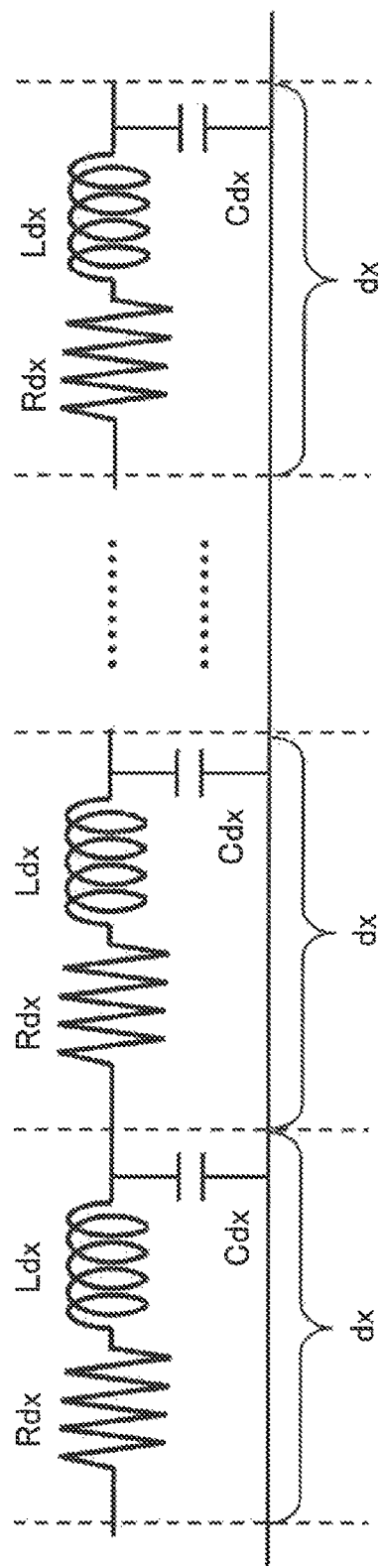
FIG. 5 is a diagram illustrating one example of an electric circuit configuring a ladder circuit.
Figure 6:
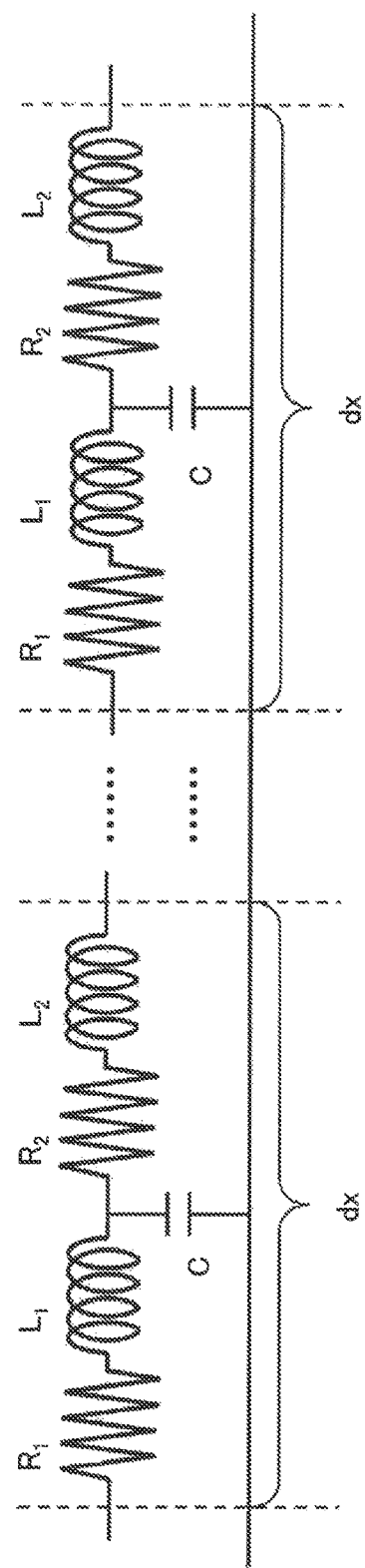
FIG. 6 is a diagram illustrating another example of an electric circuit configuring a ladder circuit.

In the specific examples exemplarily illustrated in FIG. 2 and FIG. 3, an electric circuit (one unit constituting a ladder circuit) representing a water pipe is formed with a so-called π-type shape, however the present example embodiment is not limited thereto. Configuration of the electric circuit may be appropriately selectable. The electric circuit may be, for example, an electric circuit in which L-type LCR circuits are connected as exemplarily illustrated in FIG. 5. Alternatively, the electric circuit may be, for example, an electric circuit in which T-type LCR circuits are connected as exemplarily illustrated in FIG. 6. In the present example embodiment, a π-type electric circuit as exemplarily illustrated in FIG. 3 is utilized, since an element number of the non-linear resistance "R" is small, and characteristics are the same with respect to both right and left ends.

Next, a method for representing the electric circuit 302 as exemplarily illustrated in FIG. 3 as an electric circuit model analyzable by an electric circuit simulator will be described. Hereinafter, in the present example embodiment, it is assumed that, as one example, a software program referred to as LTspice ([retrieved in the Internet on Sep. 24, 2014], <URL:http://www.linear-tech.co.jp/designtools/software/>) developed by Linear Technology Corporation in the U.S.A. is used. The present example embodiment is not limited thereto, and various electric circuit simulators capable of analyzing a non-linear resistance by being represented as model can be accepted.

As represented in above equation (5), the resistance "R" in the electric circuit 302 is the non-linear resistance that is non-linearly changed depending on a flow rate (current). To express (convert) the electric circuit 302 as a model (electric circuit model) analyzable using an electric circuit simulator, a model representing the non-linear resistance "R" is needed. The non-linear resistance "R" can be represented as a model using, for example, a current-dependent or voltage-dependent variable resistance prepared in an electric circuit simulator or an element representing a current-dependent or voltage-dependent current source or voltage source. In the present example embodiment, as a specific example, a non-linear voltage source which is able to change output voltage depending on a current is used to represent the non-linear resistance "R" as a model.

When LTspice is used as an electric circuit simulator, the non-linear resistance "R" may be represented by use of a non-linear dependent source (hereinafter, referred to as a "B element"). In LTspice, "Arbitrary behavioral voltage source (BV)" representing the non-linear dependent source as a voltage source and "Arbitrary behavioral current source (BI)" representing the non-linear dependent source as a current source are provided.

A function prepared in LTspice can be assigned for the "B element". The "B element" can adjust an output voltage (or an output current) in accordance with the function. A function able to be assigned for the B element and variables usable in the function or the like are derived from known techniques, and therefore detailed description will be omitted.

As described above, in the non-linear resistance "R", a resistance value thereof is changed depending on a flow rate (current) (i.e. a voltage of both ends of the non-linear resistance "R" is changed). Therefore, a function representing a relation between a current and a voltage (an output of the B element) is assigned for a "B element" representing the non-linear resistance "R" as a model.

A Hazen-Williams equation representing a relation between a pressure loss (loss water head) and a flow rate in water flowing in a water pipe (pipe) can be assigned as the function. The Hazen-Williams equation in a water pipe is represented as following equation (6).

$$P = \frac{10.67 l Q^{1.85}}{C_Q^{1.85} D^{4.87}} \quad (6)$$

where:
P: a pressure loss (loss water head),
$C_Q$: a flow rate (flow velocity) coefficient,
D: a diameter of a pipe,
l: a pipe length,
Q: a flow rate (obtained from a product of a flow velocity and a pipe cross-section area).

In above equation (6), when a pressure loss "P" and a flow rate "Q" are replaced with a voltage "v" and a current "i", respectively, following equation (7) is obtained.

$$v = \frac{10.67 l}{C_Q^{1.85} D^{4.87}} |i|^{0.85} i \quad (7)$$

where |i| represents an absolute value of a current i.

In an electric circuit, current may flow from either of right and left ends, and therefore it is necessary to handle a negative value as a current value or voltage value. Therefore, in equation (7), to reflect a sign of the current "i", a power of an absolute value of the current "i" is multiplied by a value representing one power of the current "i" with a sign.

In the present example embodiment, for the "B element" representing the non-linear resistance "R" as a model, a function formulated by above equation (7) is assigned. In other words, an output voltage of the "B element" is non-linearly changed on the basis of the function represented by equation (7) in accordance with a current flowing in the "B element".

Figure 7:
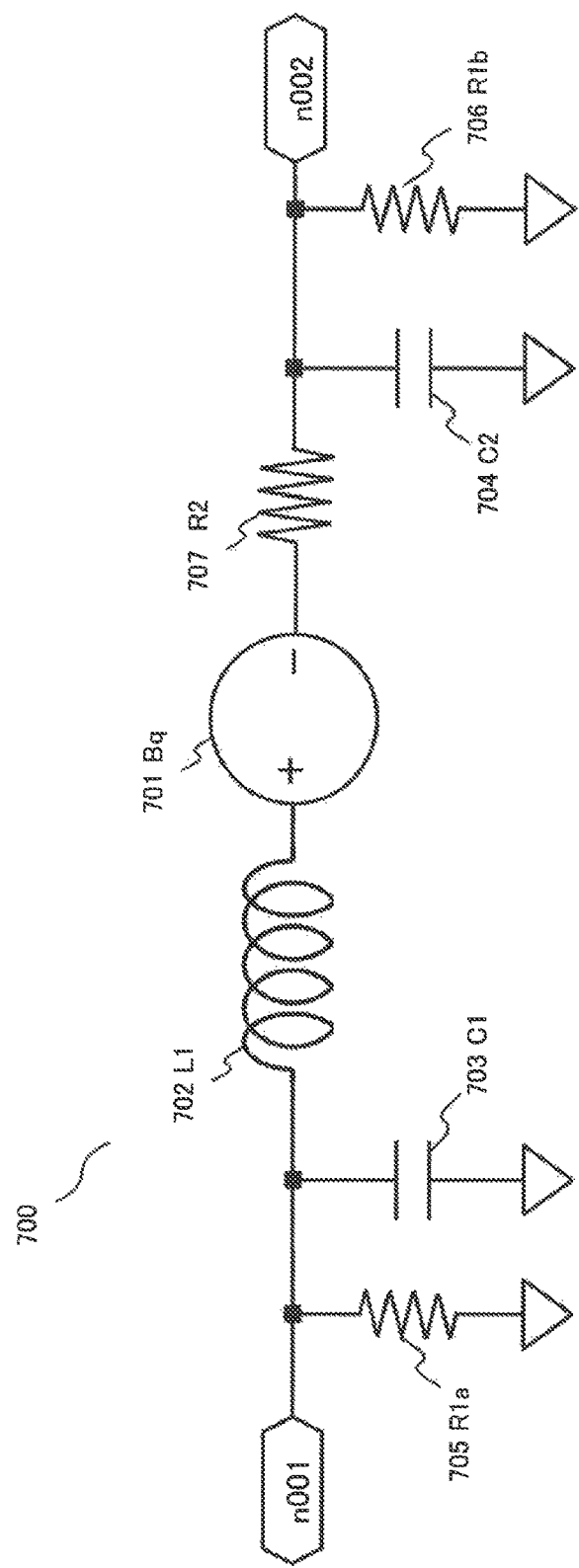
FIG. 7 is a diagram illustrating a specific example of an electric circuit representing a water pipe (pipe).

The present example embodiment is not limited thereto, and for the "B element", any function representing a relation between a pressure loss (loss water head) and a flow rate (or a flow velocity) is acceptable. As such a function, for example, a Darcy-Weisbach equation or a Weston equation is acceptable other than the Hazen-Williams equation. These equations are known, and therefore detailed description will be omitted Using a "B element" as described above, one specific example of an electric circuit model representing the electric circuit 302 exemplarily illustrated in FIG. 3 is illustrated in FIG. 7. For a "B element" (Bq, 701) in an electric circuit model 700 exemplarily illustrated in FIG. 7, a function represented by equation (7) is assigned. In the function, for the flow rate coefficient "$C_Q$" and the pipe diameter "D", appropriate values are set, in accordance with specifications of an original water pipe (301 in FIG. 3). For "L1" (702), "C1" (703), and "C2" (704) in FIG. 7, in accordance with the specifications of the original water pipe (301 in FIG. 3), appropriate values are set from equation (5). For "C1" and "C2", appropriate values are appropriately set so that a combined capacitance thereof represents "C" in equation (5).

In the electric circuit model 700 exemplarily illustrated in FIG. 7, resistances "R1a" (705 in FIG. 7) and "R1b" (706 in FIG. 7) and a resistance "R2" (707 in FIG. 7) that are not explicitly illustrated in the original electric circuit 302 are connected. The resistance "R1a" (705) is connected in parallel to a capacitor "C1" (703). The resistance value of "R1a" is a relatively large. The resistance "R1b" (706) is connected in parallel to a capacitor C2 (704). The resistance value of "C2" is relatively large. The resistance "R2" (707) is connected in series to an inductor (inductance element) "L1" (702). The resistance value of "R2" is a relatively small. Resistances having resistance values differing from each other may be connected to "C1" (703) and "C2" (704), respectively.

By introducing resistances "R1a" (705) and "R1b" (706) and the resistance "R2" (707), following advantages are obtained upon analyzing the electric circuit model 700 using an electric circuit simulator, for example:

Reduce or prevent a resonance due to a combination of an inductor and a capacitor and suppress divergence of various types of calculations in analysis processing, Suppress divergence due to an accumulation of minute errors from various types of calculations in analysis processing, Suppress to output infinite value when an ideal voltage source and an ideal current source are included in a circuit model, when the circuit is short-circuited (shorts) or is released (open), and prevent errors of various types of calculations in analysis processing, and Suppress to output an infinite value in an inductor or capacitor when a circuit model is subjected to direct current analysis, and prevent errors in various types of calculations in analysis processing.

Specific resistance values of the resistances "R1a" (705) and "R1b" (706) and the resistance "R2" (707) are set to be appropriate values in consideration of accuracy necessary for analysis. That is, as the resistance values, values that cause only sufficiently small change in value with respect to variations of a voltage and a current in a circuit model, are set. More specifically, for the resistances "R1a" (705) and "R1b" (706), for example, large resistance values may be set so that currents flowing in these resistances are smaller, by four digits or more, than the entire current flowing in the electric circuit model 700. In addition, for the resistance "R2" (707), for example, a small resistance value may be set so that a difference (variation) in voltage value between a case of including the resistance "R2" (707) and a case not including the resistance "R2" (707) becomes small by four digits or more. It is possible to select whether to include the resistances "R1a" (705) and "R1b" ("706) and the resistance "R2" (707), on the basis of a result obtained by actually analyzing an electric circuit using a simulator.

A model (a net list) in LTspice representing the electric circuit model exemplarily illustrated in FIG. 7 is exemplarily illustrated in FIG. 8. Specific numerical values set in the net list exemplarily illustrated in FIG. 8 are one example. These numerical values are appropriately set in accordance with specifications of an original water pipe (pipe).

In FIG. 8, "highimp" and "lowimp" are definitions of a high impedance value (high resistance value) and a low impedance value (low resistance value) and are set for "R1a" and "R1b", and "R2", respectively.

"Bq" in FIG. 8 represents a "B element" (Bq, 701) in FIG. 7. The function represented by equation (7) is assigned for the "Bq". Specifically, "I(Bq)" corresponds to the flow rate "Q" (current "i") flowing in the element "Bq". "D" (a diameter of a pipe) in equation (7) is set as "D=1." In FIG. 8, a flow rate coefficient in equation (7) is represented as "R", and the flow rate coefficient is set as "R=100." The term "abs(I(Bq))" represents an absolute value of "I(Bq)".

[System Configuration]

Figure 9:
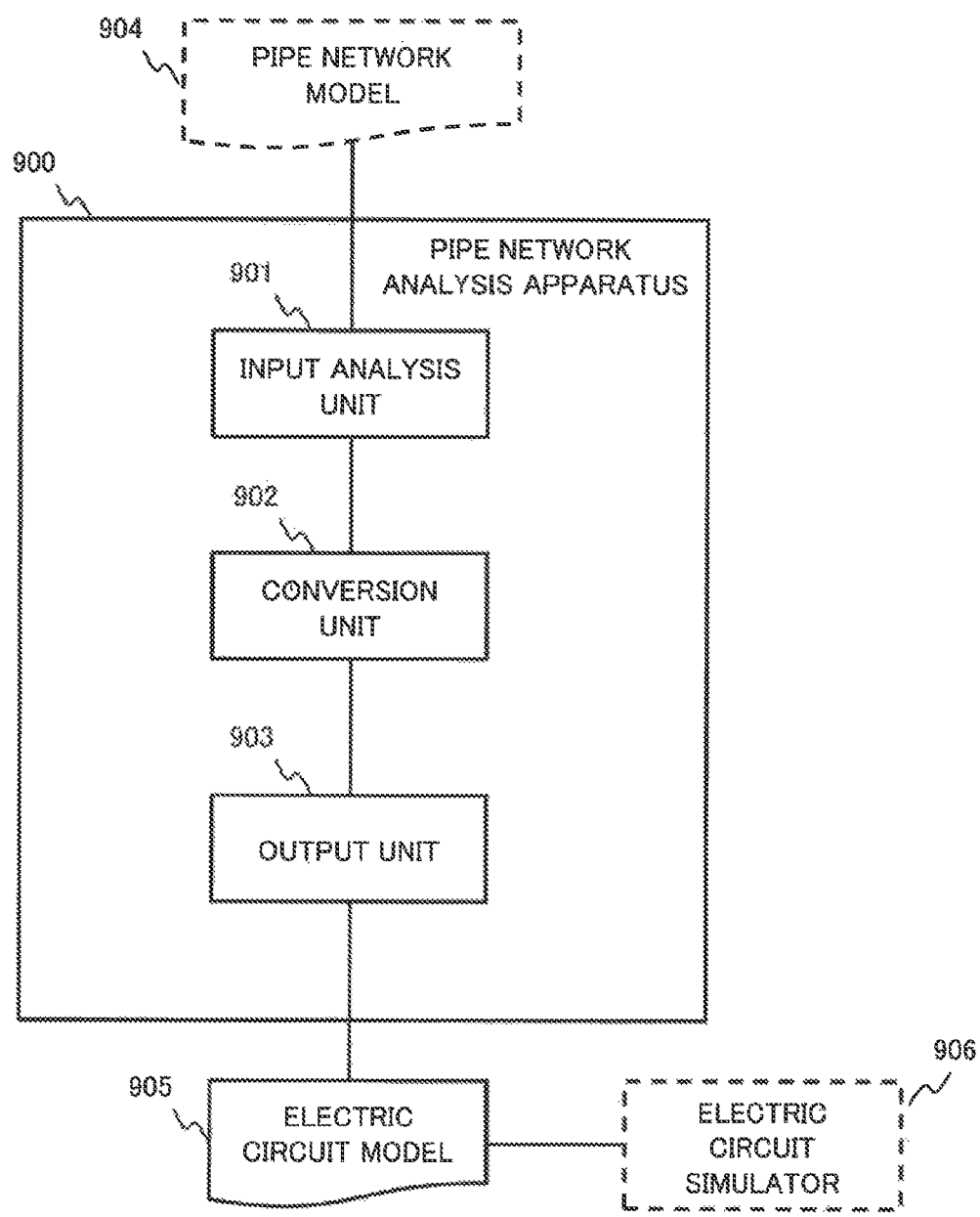
FIG. 9 is a block diagram exemplarily illustrating a functional configuration of a pipe network analysis apparatus in a first example embodiment of the present invention.

Next, a specific configuration example of an analysis apparatus (pipe network analysis apparatus) that is able to convert a pipe network to an electric circuit network will be described with reference to drawings. FIG. 9 is a block diagram exemplarily illustrating a functional configuration of an analysis apparatus in the present example embodiment. The configuration exemplarily illustrated in FIG. 9 is one example, and the present example embodiment is not limited thereto. In other words, respective components exemplarily illustrated in FIG. 9 may be appropriately integrated or further divided, and may be realized by a plurality of apparatuses or the like physically or logically separated.

As exemplarily illustrated in FIG. 9, a pipe network analysis apparatus 900 in the present example embodiment includes an input analysis unit 901, a conversion unit 902, and an output unit 903.

The input analysis unit 901 receives a pipe network model 904 which represents a pipe network of a water pipe as a model. The input analysis unit 901 extracts, for example, elements (e.g. a water pipe (pipe), various types of valves, various types of tanks, and various types of pumps) of the pipe network represented by the pipe network model 904 and a connection relation between the elements. When the pipe network model 904 is, for example, a model of an EPANET format, the input analysis unit 901 may analyze the model of the EPANET format and extract elements of the water pipe network included in the model and the connection relation of the element pipes. The input analysis unit 901 is not limited to the EPANET format and may analyze the pipe network model 904 described by any mechanically interpretable format.

The conversion unit 902 replaces (converts) the elements of the pipe network model 904 (elements of the water pipe network) analyzed in the input analysis unit 901 with (to) elements of an electric circuit network. That is, the conversion unit 902 converts a water pipe, various types of valves, various types of tanks, various types of pumps, and the like that are the elements of the pipe network model 904 to elements of an electric circuit network representing the respective elements. More specifically, the conversion unit 902 converts, for example, the water pipe to an LCR circuit (a distributed constant circuit or a ladder circuit) on the basis of the above-described method.

The conversion unit 902 may execute the conversion, for example, on the basis of conversion information that associates elements of a pipe network with elements of an electric circuit network representing the elements of the pipe network. Conversion information relating to a water pipe (pipe) includes, for example, information which is used to calculate values set for the respective elements illustrated in FIG. 7 (for example, on the basis of equation (5) and equation (6)), based on specifications for an original water pipe (pipe). The conversion information may be included inside the pipe network analysis apparatus 900 or may be included in any system that can be referred to from the pipe network analysis apparatus 900, in any format such as a table, a database, and the like.

The output unit 903 outputs, on the basis of the elements of the electric circuit network converted by the conversion unit 902, an electric circuit model 905 analyzable by a specific electric circuit simulator 906. For example, when the electric circuit simulator 906 is SPICE, the output unit 903 may output a net list for the SPICE as the electric circuit model 905. Without limited to above, the output unit 903 may output, the electric circuit model 905 of an appropriate format in accordance with a type of the electric circuit simulator 906.

Figure 10:
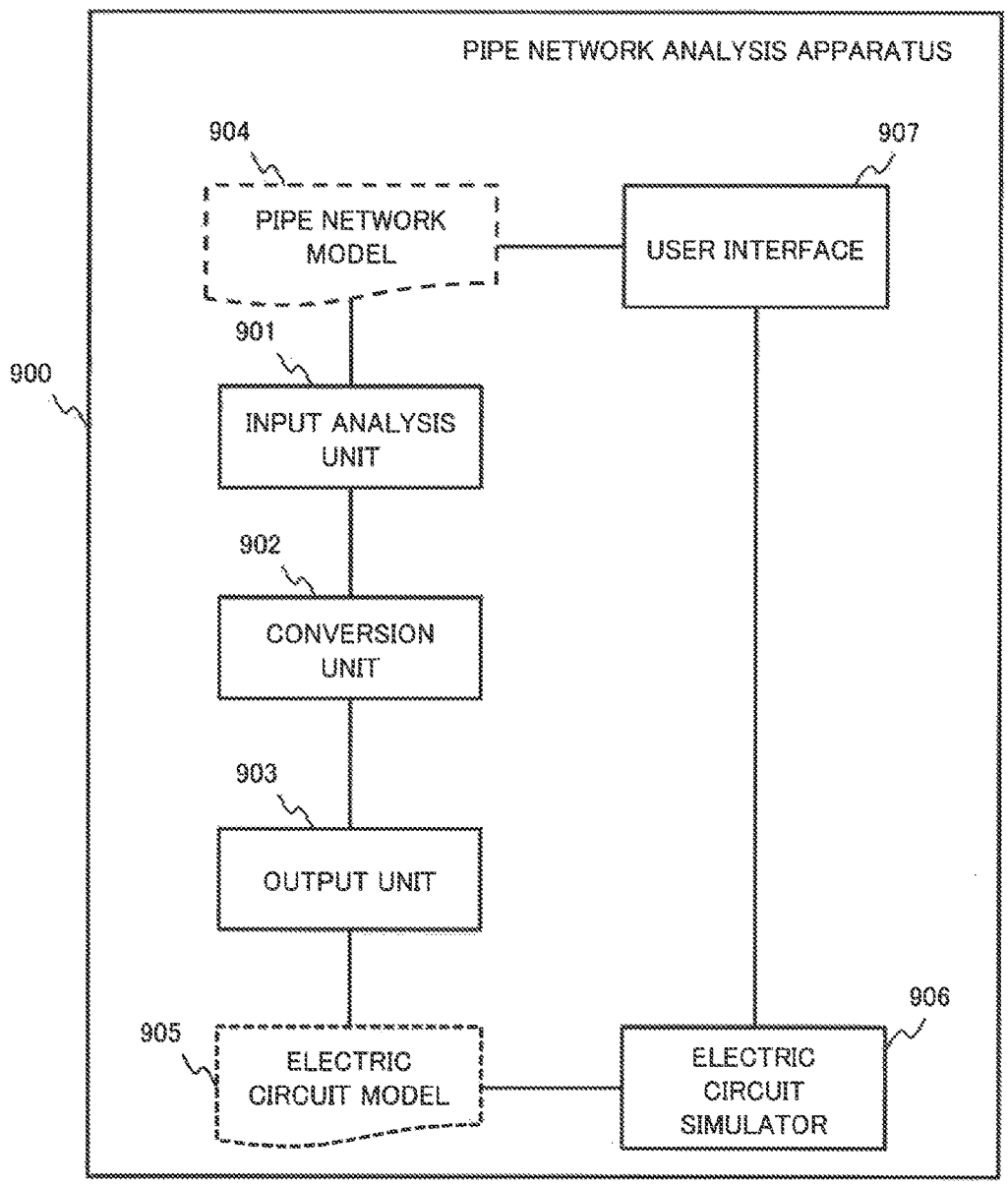
FIG. 10 is a block diagram exemplarily illustrating another configuration of the pipe network analysis apparatus in the first example embodiment of the present invention exemplarily illustrated in FIG. 9.

The pipe network analysis apparatus 900 in the present example embodiment may be configured, for example, as in FIG. 10. In this case, the pipe network analysis apparatus 900 further includes a user interface 907.

The user interface 907 may provide, for example, an interface for directly inputting the pipe network model 904 for the user of the pipe network analysis apparatus 900. Alternatively, the interface may provide, for example, a drawing function for the user to appropriately arrange elements of a pipe network and draw a connection relation among these elements. The user interface 907 may provide a function of displaying, to the user or the like, an analysis result for the electric circuit model 905 obtained by the electric circuit simulator 906.

As described above, the electric circuit simulator 906 in the present example embodiment may be a well-known SPICE (LTspice or the like) or may be another well-known simulator.

Figure 11:
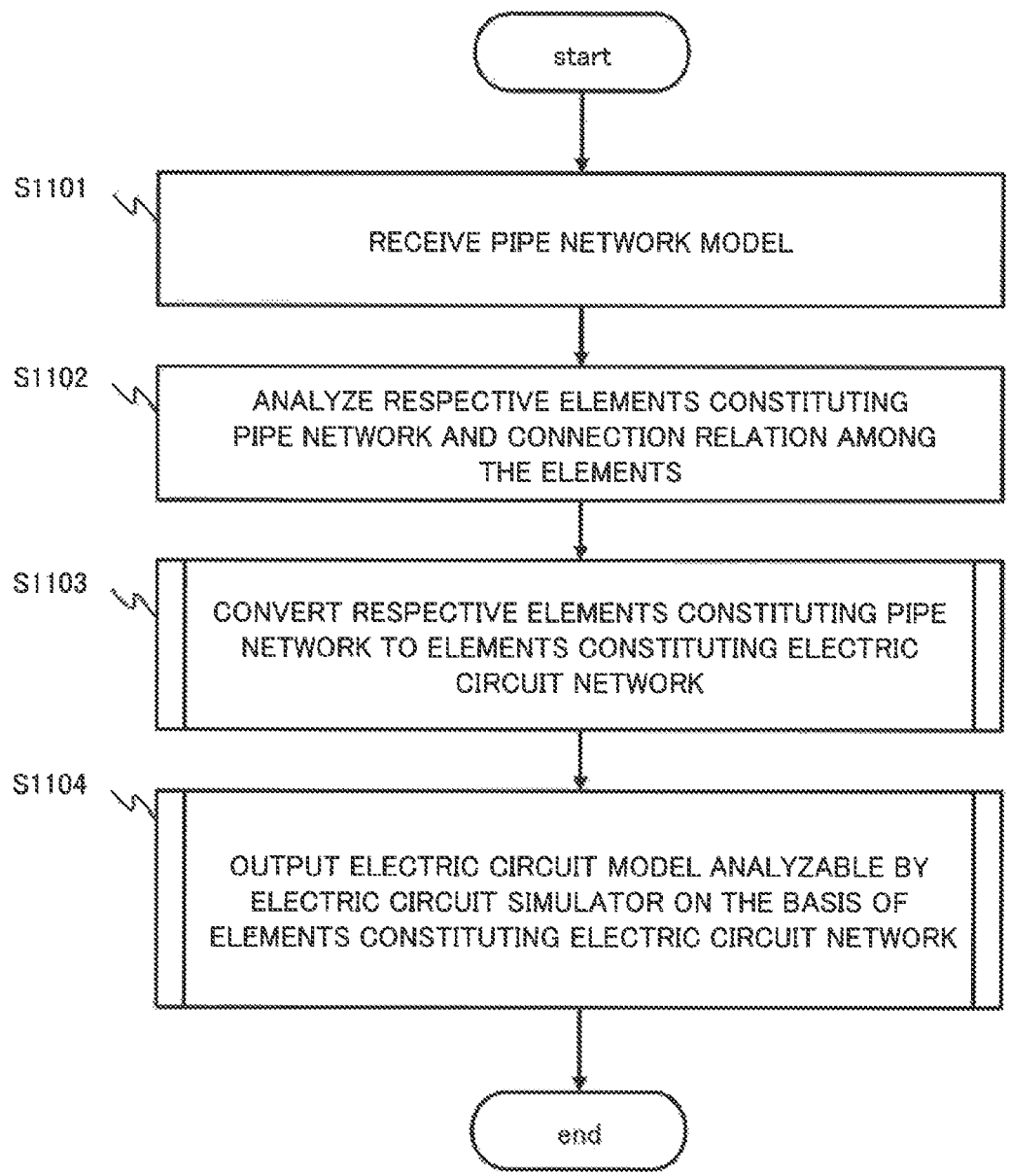
FIG. 11 is a flowchart exemplarily illustrating an operation of the pipe network analysis apparatus in the first example embodiment of the present invention.

Next, an operation of the pipe network analysis apparatus 900 in the present example embodiment configured as described above will be described with reference with FIG. 11. FIG. 11 is a flowchart exemplarily illustrating the operation of the pipe network analysis apparatus 900.

First, the input analysis unit 901 receives a pipe network model 904 (step S1101). In this case, the input analysis unit 901 may receive, for example, the pipe network model 904 input via the user interface 907.

The input analysis unit 901 analyzes respective elements constituting a pipe network and a connection relation among these elements, by analyzing the input pipe network model 904 (step S1102).

The conversion unit 902 converts the elements constituting the pipe network to elements constituting an electric circuit network on the basis of the result obtained by the analysis in step S1102 (step S1103). In this case, as described above, the conversion unit 902 may execute the conversion, for example, on the basis of conversion information that associates elements of a pipe network with elements of an electric circuit network representing the elements of the pipe network.

The output unit 903 outputs an electric circuit model analyzable by the electric circuit simulator 906, on the basis of the elements constituting the electric circuit network obtained by the conversion in step S1103 (step S1104).

The pipe network analysis apparatus 900 in the present example embodiment configured as described above can replace (convert) a pipe network (e.g. the pipe network model 904) such as a water pipe with (to) an electric circuit network. More specifically, the pipe network analysis apparatus 900 can represent an element (e.g. a water pipe (pipe)) of a pipe network using an element representing an electric circuit network (e.g. a distributed constant circuit or a ladder circuit including a non-linear resistance). The reason is that the conversion unit 902 is able to represent an element in the water pipe network non-linearly changes in accordance with a flow rate or a water head (water pressure) by use of a non-linear element in an electric circuit network, and thereby is able to convert (replace) an element of a water pipe network to (with) a circuit element in an electric circuit.

The pipe network analysis apparatus 900 in the present example embodiment is able to analyze a model (e.g. the electric circuit model 905) representing an electric circuit network converted from a pipe network, by use of an electric circuit simulator (e.g. the electric circuit simulator 906). The reason is that the output unit 903 outputs the electric circuit model 905 analyzable by the electric circuit simulator 906 on the basis of elements of an electric circuit network converted from elements of a pipe network. Thereby, according to the present example embodiment, it is possible to analyze a state of a pipe network of water or the like by use of an electric circuit simulator.

Processing for analyzing a specific water pipe network using the pipe network analysis apparatus 900 configured as described above will be described.

FIRST SPECIFIC EXAMPLE

Hereinafter, a first specific example in the present example embodiment will be described. In the present specific example, it is assumed that data of a model representing a water pipe network being the same as illustrated in FIG. 1 (see p. 85 in above NPT 1) of NPL 1 is given as the pipe network model 904. Hereinafter, the model representing the water pipe network may be referred to as a "first water pipe network model."

The pipe network analysis apparatus 900 replaces (converts) a water pipe network represented by the first water pipe network model with (to) an electric circuit network and analyzes the electric circuit network. The water pipe network illustrated in FIG. 1 of above NPL 1 includes a valve, a surge tank, a constant water head reservoir, and a water pipe connecting these elements. For specifications of these elements of the water pipe network, refer to above NPL 1.

The first water pipe network model is expressed by any mechanically interpretable format and includes the following data as data relating to a water pipe:

Specifications such as a length, a diameter, roughness of a wall surface, and the like with respect to each water pipe (pipe) (for specific values, refer to p. 86, Table 1 in above NPL 1), A function representing a pressure loss in a water pipe (in the present specific example, a Darcy-Weisbach equation and coefficients thereof), Connection information among respective water pipes.

The first water pipe network model further includes the following data with respect to other elements (a valve, a surge tank, a reservoir, and the like) other than the water pipes in the water pipe network:

Specifications of other elements, connection information, and a function representing characteristics and coefficients thereof or the like, Information (a boundary condition) relating to operations of other elements at each time.

The information relating to operations of other elements at each time includes, for example, an opening and closing state of a valve at a specific clock time, a water level at a start time of simulation in a serge tank or reservoir.

The pipe network analysis apparatus 900 analyzes a first water pipe network model input from a user or the like unillustrated and analyzes elements of a water pipe network and a connection relation between these elements (step S1102 in FIG. 11).

The pipe network analysis apparatus 900 converts the elements of the first water pipe network model (the elements of the water pipe network) to elements of an electric circuit network (step S1103 in FIG. 11). In the following, processing of the conversion unit 902 in the pipe network analysis apparatus 900 for converting an element of a water pipe to an element of an electric circuit network, will be described.

The conversion unit 902 generates an electric circuit model as exemplarily illustrated in FIG. 7 on the basis of specifications of a water pipe included in the first water pipe network model. In the present specific example, as a function set for the element "Bq" (701 of FIG. 7, a non-linear resistance) exemplarily illustrated in FIG. 7, a Darcy-Weisbach equation is set.

In the following, processing of the conversion unit 902 for converting a valve in a water pipe network to an element constituting an electric circuit network will be described. First, a pressure loss in a valve depends on a flow rate and a degree of opening of the valve (an operation amount of the valve). Therefore, a pressure loss in a valve is formulated as following equation (8) as a function of a flow rate and a degree of opening of the valve (see equation (8) described on p. 84 in NPL 1).

$$f(Q) = K \frac{1}{2gA^2} q|q| \tag{8}$$

where:
f(Q): a pressure loss,
K: a loss coefficient of a valve (a function depending on a degree of opening of a valve),
g: a gravity acceleration,
A: a cross-section area of a water pipe (pipe),
q: a flow rate.

A valve represented as in equation (8) can be represented as a non-linear resistance in which a resistance value is non-linearly changed depending on a current. In this case, the non-linear resistance is configured to change its resistance value in accordance with external input corresponding to a loss coefficient of a valve.

Figure 12:
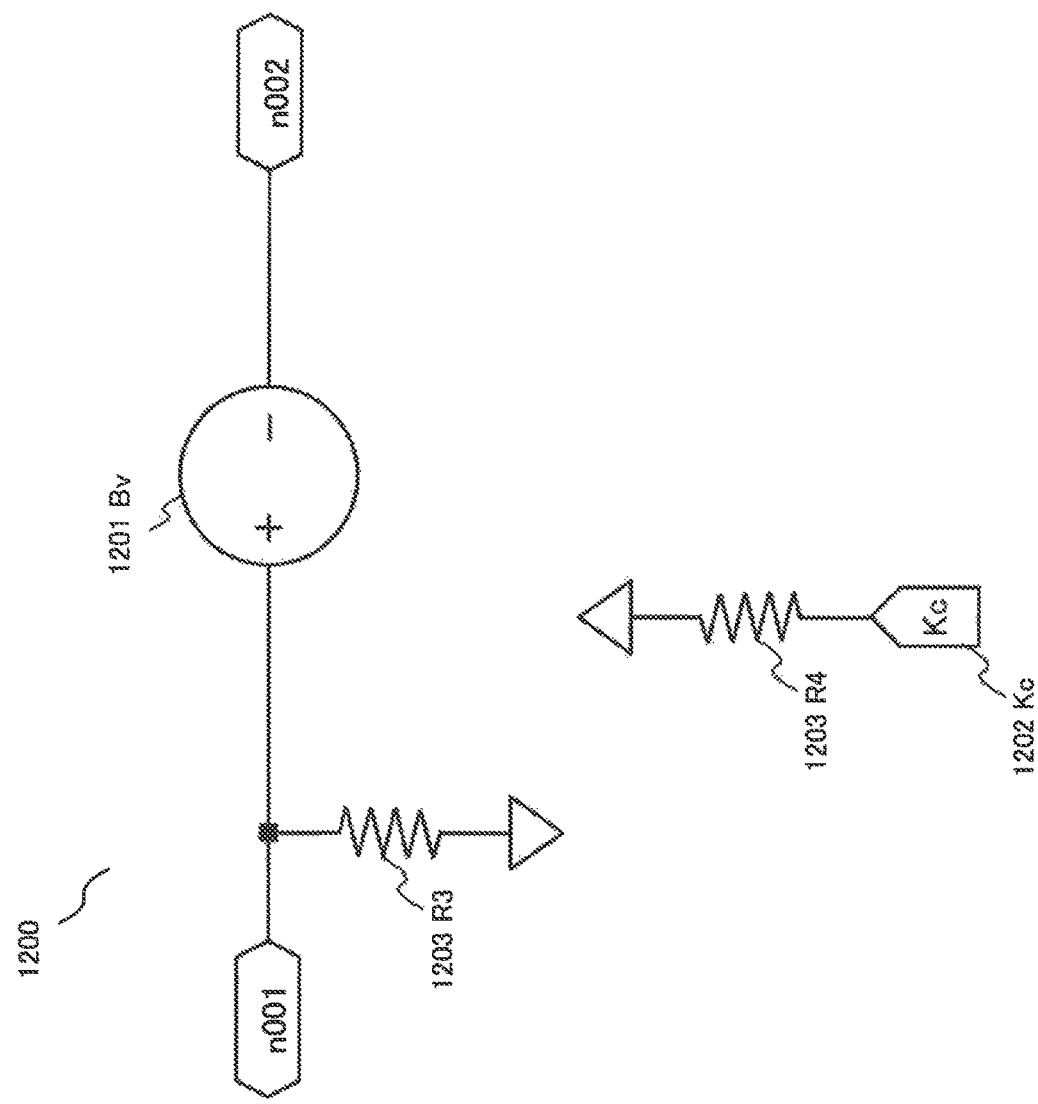
FIG. 12 is a diagram illustrating a specific example of an electric circuit representing a valve, and being generated by the pipe network analysis apparatus in the first example embodiment of the present invention.

One specific example representing the above-described valve as an electric circuit model is illustrated in FIG. 12. For a "B element" ("Bv", 1201) in an electric circuit model 1200 exemplarily illustrated in FIG. 12, the function represented by above equation (8) is assigned. For "V (Kc)", any value (voltage) can be externally applied. In the electric circuit model exemplarily illustrated in FIG. 12, a loss coefficient of the valve is represented by the "V (Kc)". That is, in the electric circuit model 1200 exemplarily illustrated in FIG. 12, a value corresponding to an operation amount of the valve is externally applied by adjusting "V (Kc)", as the same manner as a valve in a water pipe.

A model expression (net list) in LTspice representing the electric circuit model illustrated in FIG. 12 is exemplarily illustrated in FIG. 13. Specific numerical values set in the net list exemplarily illustrated in FIG. 13 are presented as one specific example, and these numerical values are appropriately set in accordance with specifications of an original valve.

Next, processing of the conversion unit 902 for converting a surge tank in a water pipe network to an element constituting an electric circuit network will be described. In general, a surge tank stores fluid until reaching a certain quantity, when the certain quantity is exceeded, an overflow occurs. A water quantity outflowing due to the overflow is non-linearly changed depending on a water head (water pressure). Therefore, a continuity equation regarding to a surge tank is formulated as following equation (9).

$$C\dot{\phi} = -q - f_d(\phi) \tag{9}$$

where:
$\dot{\phi}$: a time derivative of $\phi$,
C: a cross-section area of a surge tank,
$f_d(\phi)$: a water quantity overflowing due to an overflow,
q: a flow rate.

A water pressure in a surge tank depends on a capacity of fluid in which a flow rate of influent fluid is integrated. Such a characteristic of the surge tank can be expressed using a capacitor in an electric circuit. In addition, in the surge tank, when a quantity of stored fluid exceeds a certain quantity (i.e. when the quantity exceeds a specific water level), an overflow occurs. Such a characteristic of the surge tank can be expressed using a current source which is able to non-linearly change an output current depending on a voltage. In above equation (9), by replacing a flow rate "q" and a water head (water pressure) "$\phi$" with a current "i" and a voltage "v", respectively, and transposing terms so as to form an equation of the current "i", following equation (10) is obtained.

$$-i = C\frac{dv}{dt} + f_d(v) \tag{10}$$

where:
i: a current,
v: a voltage
C: a coefficient equivalent to a cross-section area of a surge tank,
$f_d(v)$: a current that is non-linearly changed depending on a voltage.

Figure 14:
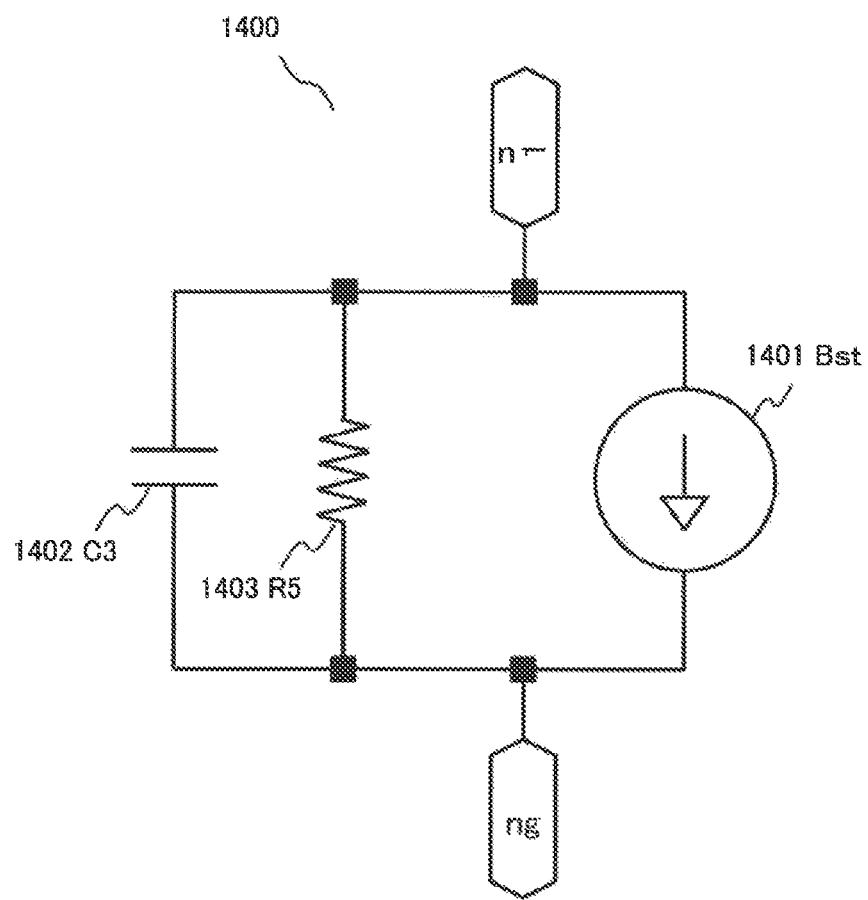
FIG. 14 a diagram illustrating a specific example of an electric circuit representing a surge tank, and being generated by the pipe network analysis apparatus in the first example embodiment of the present invention.

In other words, a surge tank can be represented using a circuit including a capacitor and a non-linear current source being combined. One specific example of the above-described surge tank represented as an electric circuit model is illustrated in FIG. 14. A function equivalent to "$f_d(v)$" in above equation (10) is assigned for a "B" element ("Bst", 1401) in an electric circuit model 1400 exemplarily illustrated in FIG. 14.

In the present specific example, the "$f_d(v)$" may be represented, for example, by following equation (11) (see p. 86 in NPL 1). In this case, the "Bst" (1401) represents a current source in which an output current is non-linearly increased when an end-to-end voltage of the element exceeds a given value "h" (corresponding to a water level of water in a surge tank).

$$i_d = C_d(v-h)^{1.5} \tag{11}$$

where:
$C_d$: a flow rate coefficient,
h: a water level of water stored in an original surge tank,
v: a voltage (a both-end voltage of a B element).

The end-to-end voltage of the "B" element ("Bst" (1401)) in the electric circuit model 1400 is equal to an end-to-end voltage of a capacitor "C3". Therefore, in the electric circuit model exemplarily illustrated in FIG. 14, the capacitor "C3" is charged until the end-to-end voltage of the capacitor "C3" reaches a specific value. This represents, as a model, a nature of a surge tank, that fluid is stored up to a specific water level. When a end-to-end voltage of the capacitor "C3" exceeds a specific value, an output current is non-linearly changed in accordance with an exceeded voltage value. This represents, as a model, a nature of a surge tank that fluid outflows when a specific water level is exceeded.

A model expression (net list) in LTspice representing the electric circuit model illustrated in FIG. 14 is exemplarily illustrated in FIG. 15. Specific numerical values set for the net list exemplarily illustrated in FIG. 15 are presented as one specific example, and these numerical values are appropriately set in accordance with specifications of an original surge tank. "Cd" in FIG. 15 is a flow rate coefficient, and "h" is a voltage value corresponding to a water head (water pressure) of water stored in the original surge tank. "Cs" is a capacitance of the capacitor "C3". A value corresponding to a cross-section area of the original surge tank is set to "C3".

Next, processing of the conversion unit 902 for converting a reservoir of a constant water head in a water pipe network to an element constituting an electric circuit network will be described. In the reservoir of a constant water head, a water head (water pressure) is not changed. Therefore the conversion unit 902 represents the reservoir as a constant voltage source in an electric circuit. A circuit model representing a constant voltage source is well known, and therefore detailed description will be omitted.

As described above, the conversion unit 902 replaces (converts) respective elements constituting an original water pipe network with (to) elements constituting an electric circuit network. The conversion unit 902 may convert elements constituting the electric circuit network to a model representing one circuit component (sub-circuit) in LTspice.

The conversion unit 902 connects, on the basis of a connection relation among the elements in the original water pipe network, the elements constituting the electric circuit network. More specifically, the conversion unit 902 determines, for example, a node where elements of an electric circuit network are connected, on the basis of a connection relation among elements of a water pipe network. The node may be assigned with identification information (e.g. a node name) which is able to uniquely identify the node.

The conversion unit 902 arranges the elements constituting the electric circuit network according to the determined node. More specifically, the conversion unit 902 connects, for example, electric circuit models representing each water pipe, a surge tank, a valve, and a reservoir of a constant water head to nodes on the basis of respective connection relations. In this case, the conversion unit 902 may arrange sub-circuits representing the respective electric circuit models among nodes. The conversion unit 902 may set various types of parameters calculated from specifications of respective elements in an original water pipe network for respective sub-circuits.

The conversion unit 902 represents a boundary condition included in the first water pipe network model as an element of an electric circuit. In the present specific example, the conversion unit 902 generates an electric circuit model representing temporal changes of an operation amount with respect to each valve that is the boundary condition. Specifically, The conversion unit 902 generates an electric circuit model so that a voltage "V" ("Kc") in the node "Kc" illustrated in FIG. 12 and FIG. 13 represents a loss coefficient of the valve in accordance with an operation amount of the valve at each time.

In the present specific example, it is assumed that a specific valve is operated so that the valve is released until a specific elapsed time and thereafter the valve is closed in accordance with an elapsed time. An operation amount of the valve may be linearly changed or non-linearly changed with respect to the elapsed time.

Figure 16:
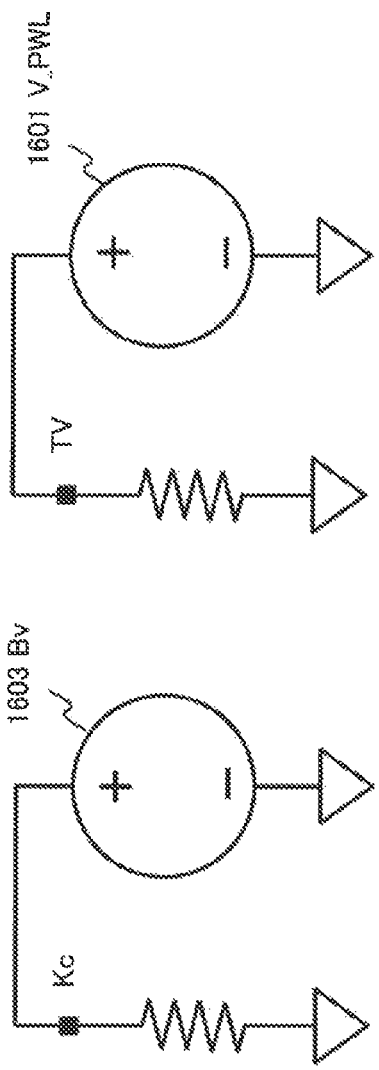
FIG. 16 is a diagram illustrating a specific example of an electric circuit representing an operation model of a valve, and being generated by the pipe network analysis apparatus in the first example embodiment of the present invention.

Specifically, the operation of the valve is represented, for example, by an electric circuit model as in FIG. 16. In FIG. 16, $V_{13}$PWL (1601) is a voltage source capable of setting an output voltage at each specific time (clock time). The "V_PWL"(1601) is represented, for example, by a PWL (Piece-wise linear) voltage source in LTspice. "Bv" (1602) is a voltage source which changes an output voltage linearly or non-linearly in accordance with an output voltage of the "V_PWL" (1601). The "Bv" (1603) is represented by a "B" element in LTspice. As one specific example, a function represented by the following equation may be set for the "Bv".

$$V(Kc) = 2 \times V\text{pwl}(T)^2 \tag{12}$$

or $$V(Kc) = 0.2 \times V\text{pwl}(T) \tag{13}$$

where:
V (Kc): a voltage value representing a loss coefficient of a valve,
Vpwl(T): an output voltage of V_PWL at an elapsed time T.

Figure 17:
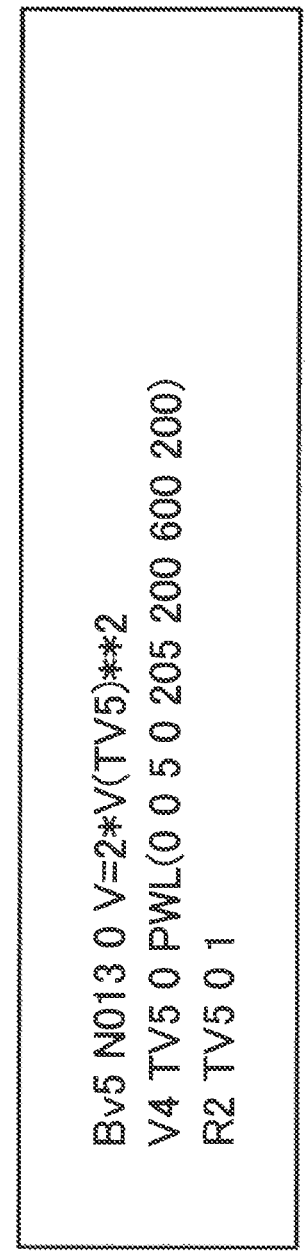
FIG. 17 is a diagram representing an electric circuit representing an operation model of a valve in a format analyzable by a specific electric circuit simulator.

A model expression (net list) in LTspice representing an electric circuit model illustrated in FIG. 16 is exemplarily illustrated in FIG. 17. Specific numerical values set for the net list exemplarily illustrated in FIG. 17 are presented as one specific example, and these numerical values may be appropriately set to represent an operation amount of a valve. In FIG. 17, a voltage source "Bv5" represents an output voltage of the "Bv2 (1603), and a voltage source "V4" represents an output voltage of the "V_PWL" (1601). In this case, an output voltage of the voltage source "V4" is changed in accordance with an elapsed time. In response to the change of "V4", an output voltage of the voltage source "Bv5" is changed in accordance with the relation equation represented in above equation (12). In accordance with the output voltage of the "Bv5", an output voltage of the "Bv" (1201) illustrated in FIG. 12 is changed. This represents change of a pressure loss in a valve according to an operation amount of the valve in an original water pipe network model, as a model.

Figure 18:
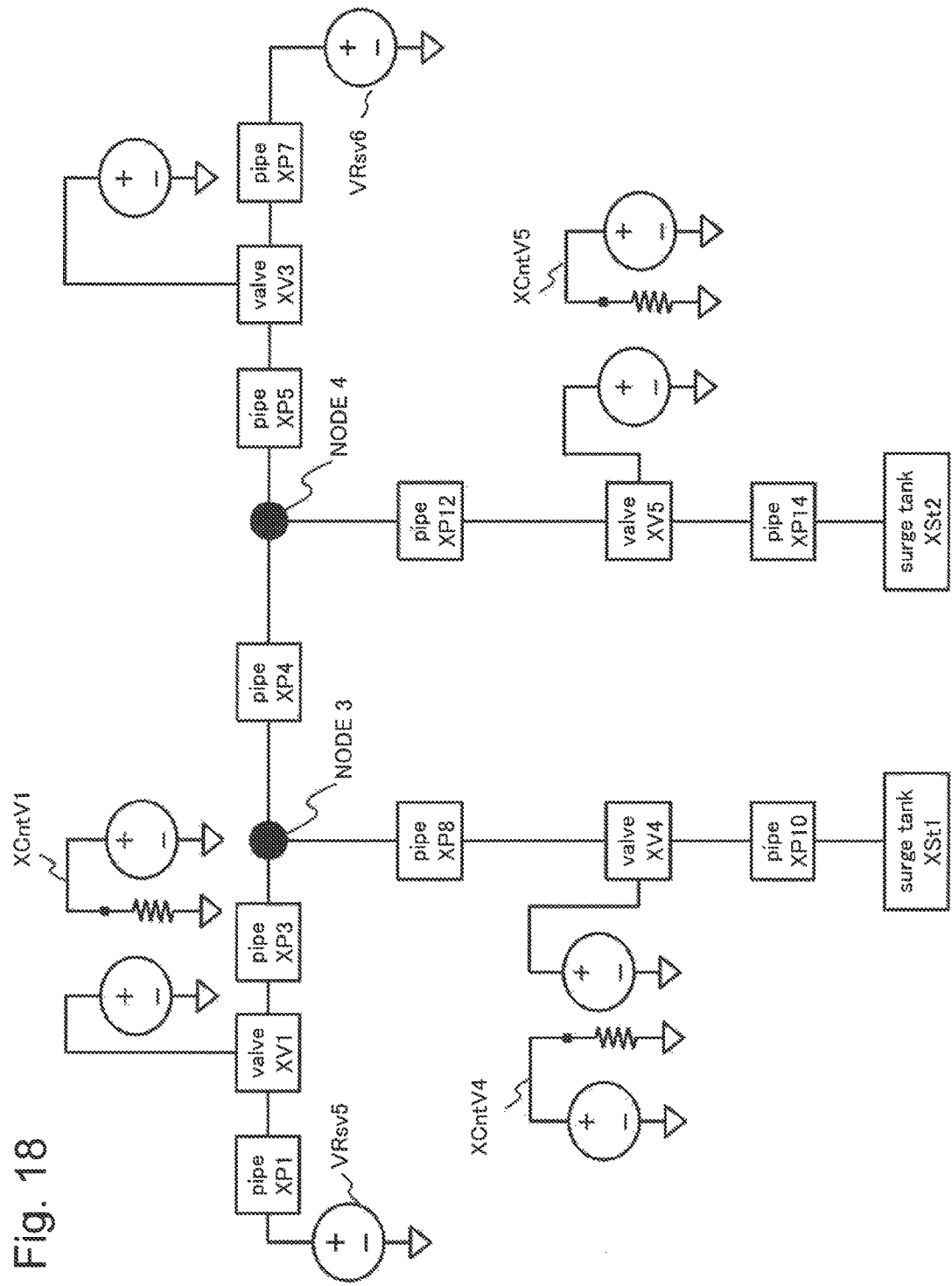
FIG. 18 is a diagram illustrating a specific example of an electric circuit model generated in a first specific example of the present invention.

An entire electric circuit model generated as above is exemplarily illustrated in FIG. 18. In FIG. 18, in "pipe," for example, an electric circuit model representing a water pipe as exemplarily illustrated in FIG. 7, is arranged. In FIG. 18, in "valve," for example, an electric circuit model representing a valve as exemplarily illustrated in FIG. 12 is arranged. In FIG. 18, in "surge tank," for example, an electric circuit model representing a surge tank, as exemplarily illustrated in FIG. 14 is arranged. "VRsv5" and "VRsv6" in FIG. 18 are respectively an electric circuit model (constant voltage source) representing a reservoir of a constant water level. "XCntV1," "XCntV4," and "XCntV5" exemplarily illustrated in FIG. 18 are models representing temporal changes of operation amounts of a valve "XV1," a valve "XV4," and a valve "XV5," respectively, and are respectively correspond to the electric circuit model exemplarily illustrated in FIG. 16. The valve "XV3" is not operated (is released), and therefore a constant voltage source is set as a model representing its operation amount.

Figure 19:
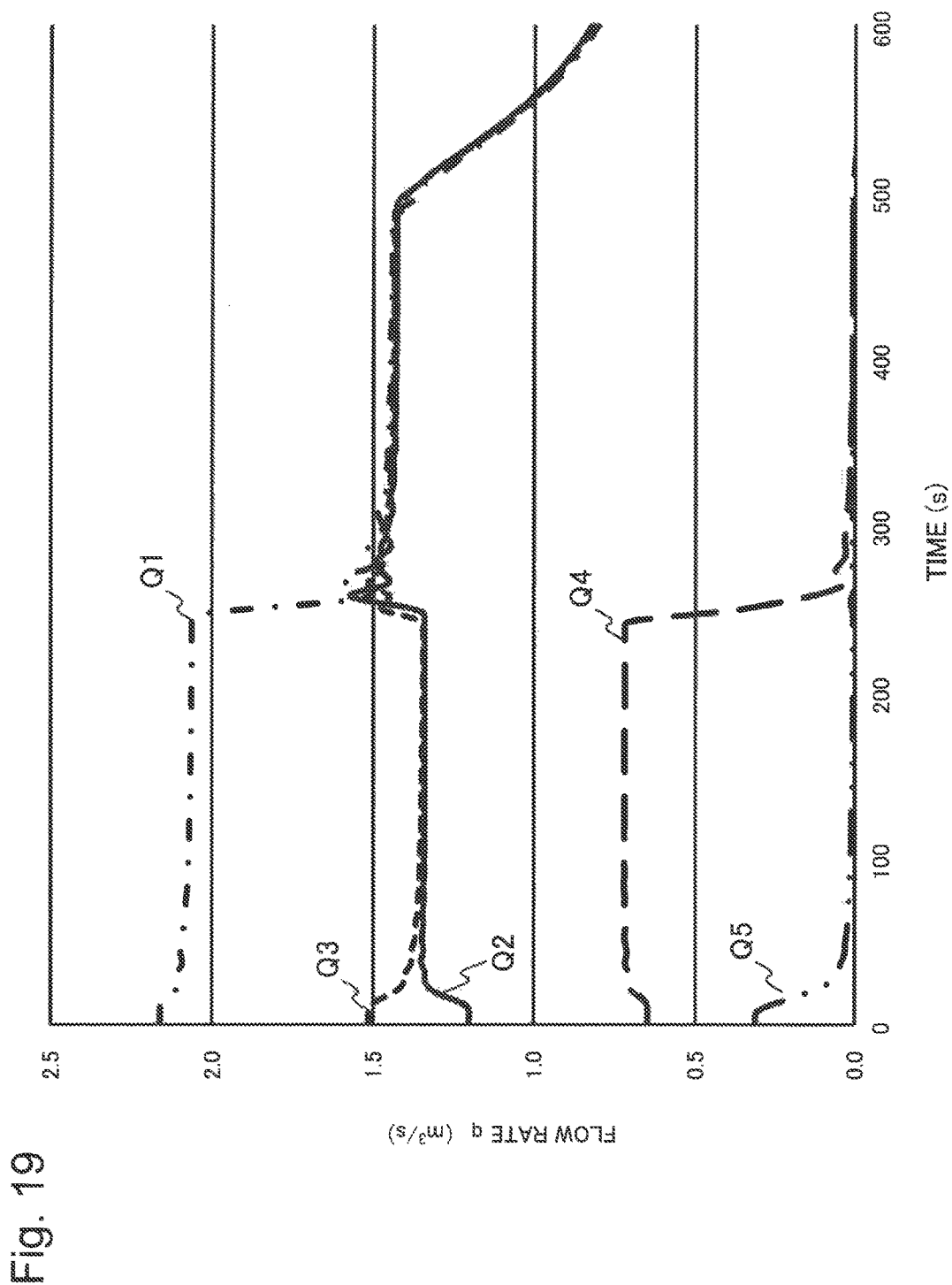
FIG. 19 is a graph (1/2) exemplarily illustrating results obtained by analyzing the electric circuit model generated in the first specific example of the present invention using a specific electric circuit simulator.
Figure 20:
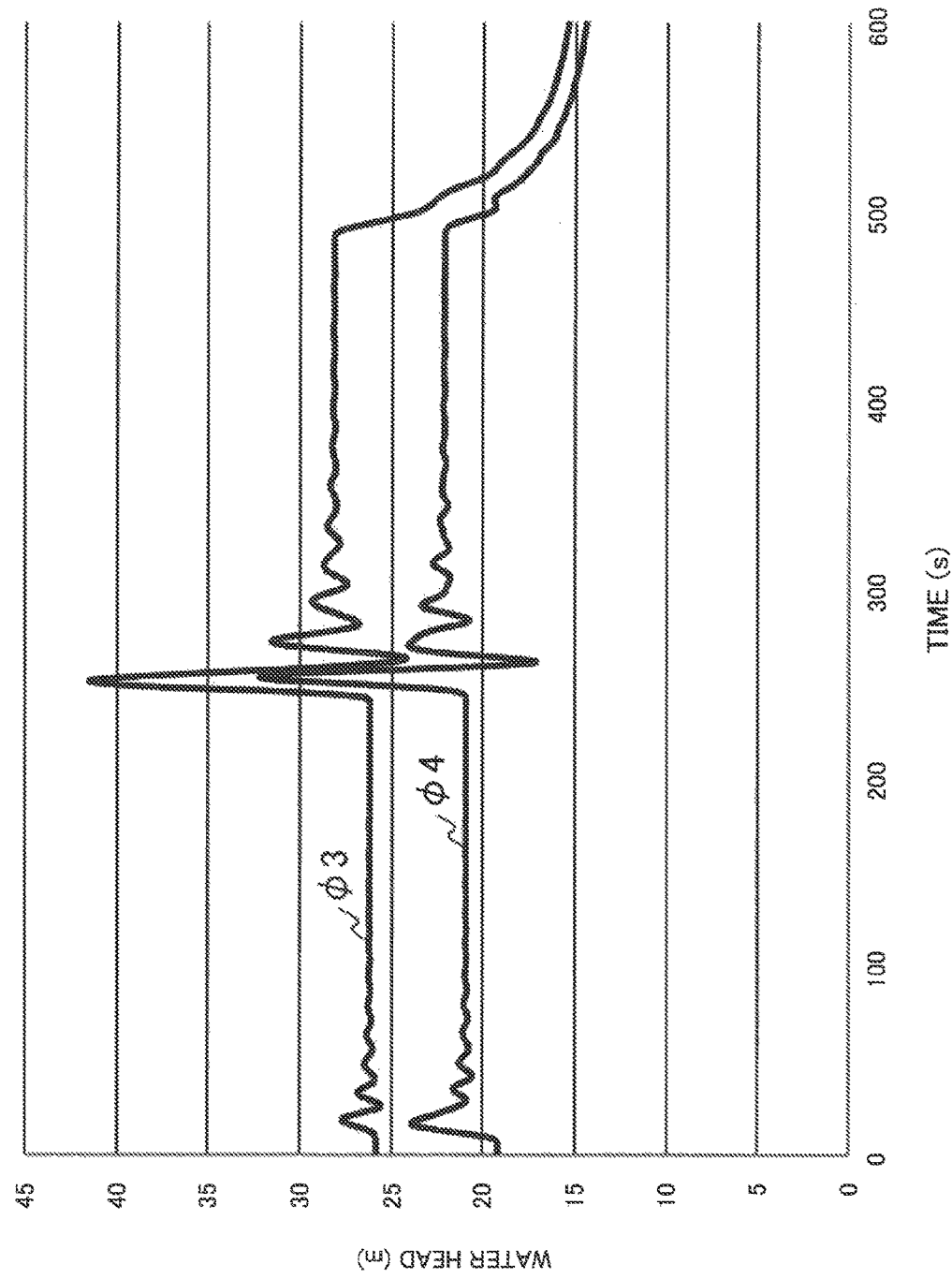
FIG. 20 is a graph (2/2) exemplarily illustrating results obtained by analyzing the electric circuit model generated in the first specific example of the present invention using a specific electric circuit simulator.

Results obtained by analyzing the electric circuit model generated as explained above by use of an electric circuit simulator (in this case, LTspice) are exemplarily illustrated in FIG. 19 and FIG. 20.

FIG. 19 represents an analysis result (changes of a flow rate in each water pipe (pipe)) corresponding to FIG. 2 (see p. 87 in NPL 1) in NPL 1. "Q1" in FIG. 19 represents temporal changes of a flow rate in a pipe "XP1" in FIG. 18. "Q2" in FIG. 19 represents temporal changes of a flow rate in a pipe "XP7" in FIG. 18. "Q3" in FIG. 19 represents temporal changes of a flow rate in a pipe "XP4" in FIG. 18. "Q4" in FIG. 19 represents temporal changes of a flow rate in a pipe "XP10" in FIG. 18. "Q5" in FIG. 19 represents temporal changes of a flow rate in a pipe "XP14" in FIG. 18.

FIG. 20 represents an analysis result (changes of a water pressure at a node) corresponding to FIG. 3 (see p. 87 in NPL 1) in NPL 1. A reference sign "ϕ3" illustrated in FIG. 20 represents temporal changes of a water head at a node 3 illustrated in FIG. 18. A reference sign "ϕ4" illustrated in FIG. 20 represents temporal changes of a water head at a node 4 illustrated in FIG. 18.

When comparing the analysis results illustrated in FIG. 19 and FIG. 20 and the analysis disclosed in NPL 1, it is apparent that graphs of flow rate changes and water head (water pressure) changes with respect to an elapsed time are very similar. In other words, it is possible to analyze a state of the original water pipe network with accuracy very close to analysis processing dedicated to a water pipe network, by analyzing the electric circuit model replaced from the water pipe network by use of an electric circuit simulator.

At a vicinity of an elapsed time of 300 (s: second) in the graphs illustrated in FIG. 19 and FIG. 20, it is understood that relative large variations occur in a flow rate in each water pipe (pipe) and a water head (water pressure) at nodes. This represents a transient phenomenon occurred in accordance with closing a valve. The variations may cause an undesirable influence (e.g. breakage or a failure associated with occurrence of a so-called water hammer phenomenon) for elements constituting a water pipe network. By analyzing an electric circuit model generated by the pipe network analysis apparatus 900 in the present example embodiment by use of an electric circuit network simulator, such a transient phenomenon can be analyzed. In other words, according to the pipe network analysis apparatus 900, by use of a technique for analyzing an electric circuit network, a pipe network such as a water and the like can be analyzed.

As described above, it is possible to execute various and fast analysis with regard to a pipe network such as water and the like, by use of an electric circuit simulator. Accordingly, it is possible to apply results of such an analysis to appropriate piping management such as prevention of failures (breakage and the like) in a pipe network and measures against deterioration.

SECOND SPECIFIC EXAMPLE

Next, a second specific example in the present example embodiment will be described. In the present specific example, processing of the pipe network analysis apparatus 900 to replace water pipe network data of a sample included in a computer program ([retrieved on Sep. 24, 2014], the Internet <URL:http://www.epa.gov/NRMRL/wswrd/dw/epanet/EN2setup.exe>) of EPANET2, which is a simulator dedicated to a water pipe network, with an electric circuit model will be described. In other words, in the present specific example, a model (hereinafter, referred to a "second water pipe network model") used in a well-known simulator (EPANET2) dedicated to a water pipe network is replaced with an electric circuit model. The EPANET 2 and sample data of it are well known, and therefore detailed description regarding contents of the EPANET 2 and an expression format of a water pipe network model of the EPANET 2 will be omitted.

The second water pipe network model in EPANET2 can include at least a pump and a tank in addition to the above-described water pipe (pipe), valve, surge tank, and reservoir. Further, in EPANET2, changes of a water consumption at each node or changes of a water level in a reservoir can be set as a pattern for each specific elapsed time.

First, the pipe network analysis apparatus 900 analyzes the second water pipe network model input from an unillustrated user and extracts elements of a water pipe network and a connection relation between those elements (step S1102 in FIG. 11).

The pipe network analysis apparatus 900 converts the elements of the second water pipe network model (the elements of the water pipe network) to elements of an electric circuit network (step S1103 in FIG. 11). Hereinafter, processing of the conversion unit 902 in the pipe network analysis apparatus 900 for converting elements of a water pipe network to elements of an electric circuit network will be described. In the following, processing for converting a pump and a tank in a water pipe network to circuit elements will be described. Other elements in the second water pipe network model can be converted to the electric circuit network by the same method as described in the first specific example.

First, processing of the conversion unit 902 to replace (convert) the pump of the water pipe network with (to) a circuit element will be described. In the second water pipe network model, with regard to the pump, a relation between a pressure and a flow rate is set. The pressure of the pump is non-linearly changed with respect to the flow rate. More specifically, the relation between the pressure and the flow rate in the pump is represented using a function described as the following equation.

$$H = A - BQ^C \quad (14)$$

where:
H: a pressure,
Q: a flow rate,
A,B,C: coefficients determined by characteristics of a pump.

A pump having a characteristic as described above is represented as a voltage source which changes a resistance value non-linearly depending on a current. The pump can be represented using a "B" element assigned with a function equivalent, for example, to above equation (14).

A model expression (net list) representing a pump in LTspice is exemplarily illustrated in FIG. 21. Specific numerical values set for the net list exemplarily illustrated in FIG. 21 are presented as one specific example, and these numerical values are appropriately set in accordance with specifications of the pump. In the model expression illustrated in FIG. 21, a function in which a sign of above equation (14) is inverted in accordance with a connection direction in an electric circuit is assigned to a non-linear element "B".

Next, processing of the conversion unit 902 for converting a tank in a water pipe network to an element constituting an electric circuit network will be described. A tank in a water pipe network can store fluid until the tank reaches a predetermined capacity (filled up with water). Such a characteristic of the tank is similar to that of a capacitor of an electric circuit.

Further, when the tank is filled up with water, a flow rate with respect to the tank becomes 0 (zero). In addition, when the tank is empty, a flow rate with respect to the tank becomes 0 (zero). Such a characteristic is similar to that of a switch in an electric circuit. From the above, the tank of the water pipe network can be represented as a circuit which includes combination of a capacitor and a current source that executes ON/OFF for a current in accordance with a pressure (voltage) of the tank.

A model expression (net list) representing a tank in LTspice is illustrated in FIG. 22. Specific numerical values set for the net list exemplarily illustrated in FIG. 22 are presented as one specific example, and these numerical values are appropriately set in accordance with specifications of the tank. In the circuit model illustrated in FIG. 22, a current source executing ON/OFF for the current in accordance with a pressure (voltage) of the tank is represented using a "B" element ("Bsw" in FIG. 22). A circuit obtained by combining the "Bsw" and the capacitor "C1" constitutes a circuit model representing the tank.

In the model expression exemplarily illustrated in FIG. 22, when a voltage in the capacitor "C1" is equal to or more than a specific upper-limit value (MaxLevel), a current in a direction of charging the capacitor "C1" is controlled to be very small. In addition, when a voltage in the capacitor "C1" is equal to or less than a specific lower-limit value (MinLevel), a current in a direction of discharging the capacitor "C1" is controlled to be very small. The controls may be executed when exceeding a specific upper-limit value (MaxLevel) and when falling below a specific lower-limit value (MinLevel).

Without limited to above, an element of a circuit that executes ON/OFF for a current in accordance with a pressure (voltage) in the tank may be configured by combining, for example, a switch element, a diode, and a current source.

Next, processing of the conversion unit 902 for representing, as a model, a pattern of changes of a water consumption at each node or changes of a water level in a reservoir will be described. The water consumption at each node in a water pipe network and the water level of a reservoir each can be represented as a voltage source (the above-described PWL voltage source) which changes an output voltage in accordance with time.

A model expression (net list) representing the change pattern thereof in LTspice is exemplarily illustrated in FIG. 23. Specific numerical values set for the net list exemplarily illustrated in FIG. 23 are presented as one specific example, and these numerical values are appropriately set in accordance with a pattern set for the second water pipe network model.

The conversion unit 902 connects elements constituting an electric circuit network on the basis of a connection relation among respective elements of the original water pipe network, in the same manner as in the first specific example. More specifically, the conversion unit 902 determines, for example, nodes where the elements of the electric circuit network are connected, on the basis of the second water pipe network model. The conversion unit 902 arranges the elements constituting the electric circuit network for the determined nodes.

In the second water pipe network model used in EPANET2, connection relations among elements constituting a water pipe network are described in a section assigned with a tag representing "[JUNCTIONS]." A water pipe is described in a section assigned with a tag representing "[PIPES]." A reservoir that maintains a constant water level is described in a section assigned with a tag representing "[RESERVOIRS]." A tank is described in a section assigned with a tag representing "[TANKS]." A pump is described in a section assigned with a tag representing "[PUMPS]." The change pattern is described in a section assigned with a tag representing "[PATTERNS]."

The conversion unit 902 may analyze these sections included in the second water pipe network model, sequentially convert each section to the electric circuit network, and output an electric circuit model analyzable by a circuit simulator.

Figure 24:
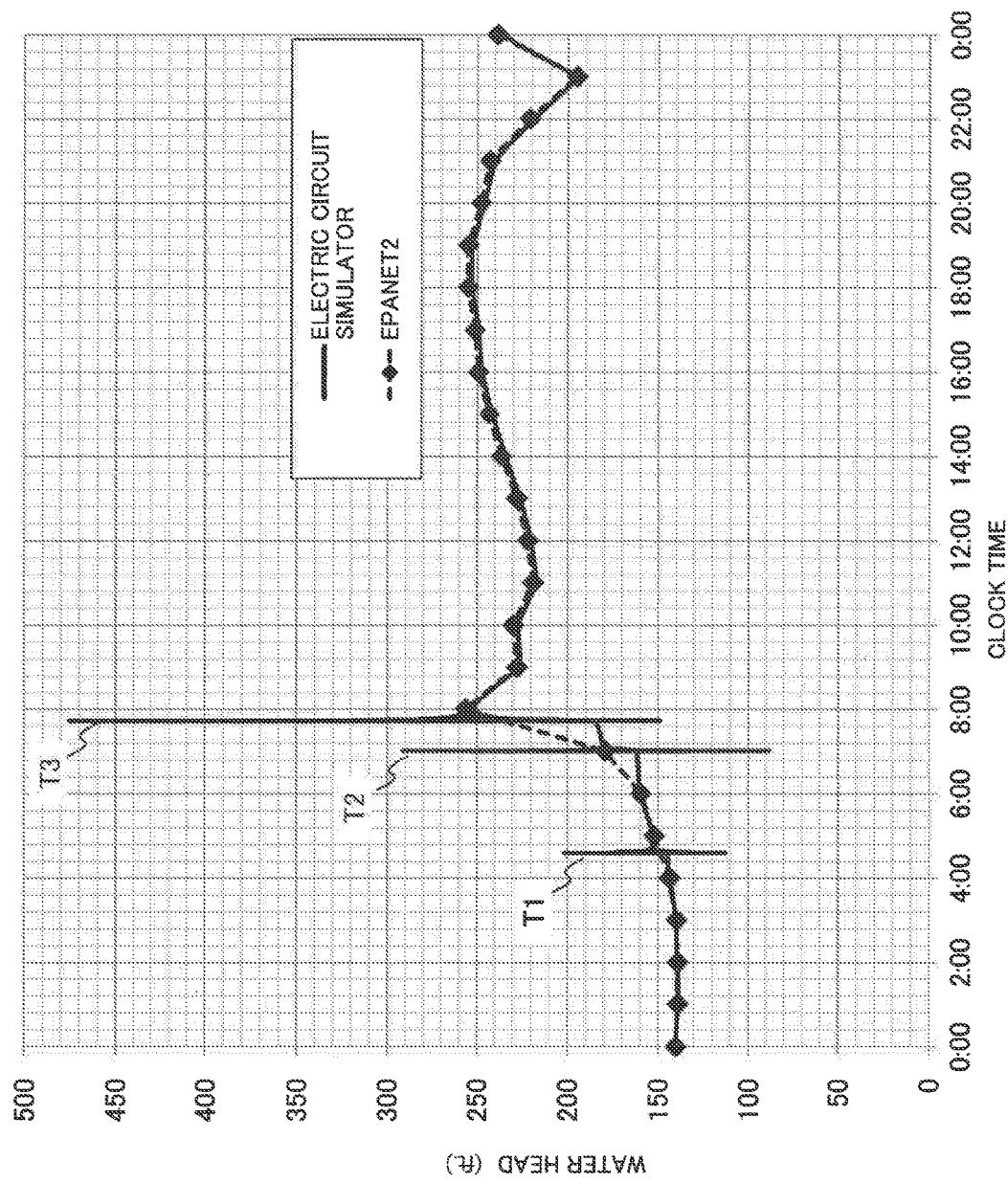
FIG. 24 illustrates graphs representing both a result obtained by analyzing an electric circuit model generated in a second specific example of the present invention by a specific electric circuit simulator and an analysis result obtained by a well-known water pipe network simulator.

FIG. 24 exemplarily illustrates a result obtained by analyzing the electric circuit model, generated from the second water pipe network model as described above, by use of LTspice, and a result obtained by analyzing the second water pipe network model using EPANET2. FIG. 24 represents temporal changes of a water head at a specific node included in the water pipe network represented by the second water pipe network model. The node is selectable.

From the analysis result illustrated in FIG. 24, it is apparent that an analysis result based on an electric circuit simulator (LTspice) and an analysis result based on EPANET2 are similar. In other words, when an electric circuit model generated from the second water pipe network model is analyzed by use of an electric circuit simulator, a state of an original water pipe network can be analyzed with accuracy close to a simulator dedicated to a water pipe network.

Further, from the analysis result based on an electric circuit simulator exemplarily illustrated in FIG. 24, it is understood that vibrations occur in T1, T2, and T3 as transient phenomena. This represent that a tank included in the second water pipe network model is filled up with water at a specific timing and a flow rate for the tank suddenly becomes 0 (zero), resulting in occurrence of a vibration. In this manner, according to analysis using the electric circuit simulator, a sudden change such as a water hammer occurring in a pipe network can be analyzed.

Such a sudden change may cause an influence (e.g. breakage or a failure) undesirable for elements constituting a water pipe network. When an electric circuit model generated by the pipe network analysis apparatus 900 in the present example embodiment is analyzed using a simulator of an electric circuit network, such a phenomenon can be analyzed. In other words, according to the pipe network analysis apparatus 900, without using a simulator dedicated to a water pipe network, a pipe network such as water can be analyzed using a technique for analyzing an electric circuit network.

As described above, it is possible to execute various and fast analysis for a pipe network such as water and the like, by use of an electric circuit simulator. Accordingly, it is also possible to apply results of such an analysis appropriately to piping management such as prevention of failures (breakage and the like) in a pipe network and measures against deterioration.

Using the first and second specific examples, specific operations of the pipe network analysis apparatus 900 in the present example embodiment have been described. As described above, in an element constituting a water pipe network, a relation between a pressure (a loss pressure or a loss water head) and a flow rate in the element may be represented by a non-linear relation equation. The pipe network analysis apparatus 900 in the present example embodiment represents such an element of a water pipe network using a non-linear element in an electric circuit network. In other words, when the relation between a pressure and a flow rate (e.g. a relation equation between them) in a specific element constituting a water pipe network is obtained, the pipe network analysis apparatus 900 can generate an electric circuit model expressing the relation using a non-linear element (e.g. a B element).

As described above, according to the pipe network analysis apparatus 900 in the present example embodiment, a pipe network that transports fluid can be represented by an electric circuit network in accordance with characteristics of the fluid. Therefore, according to the pipe network analysis apparatus 900 in the present example embodiment, the pipe network can be analyzed using a technique for analyzing an electric circuit network. The reason is that the pipe network analysis apparatus 900 replaces, in accordance with characteristics of fluid in elements constituting a pipe network, the elements of the pipe network with an electric circuit model including a non-linear element expressing the characteristics.

[Second Example Embodiment]

Figure 25A:
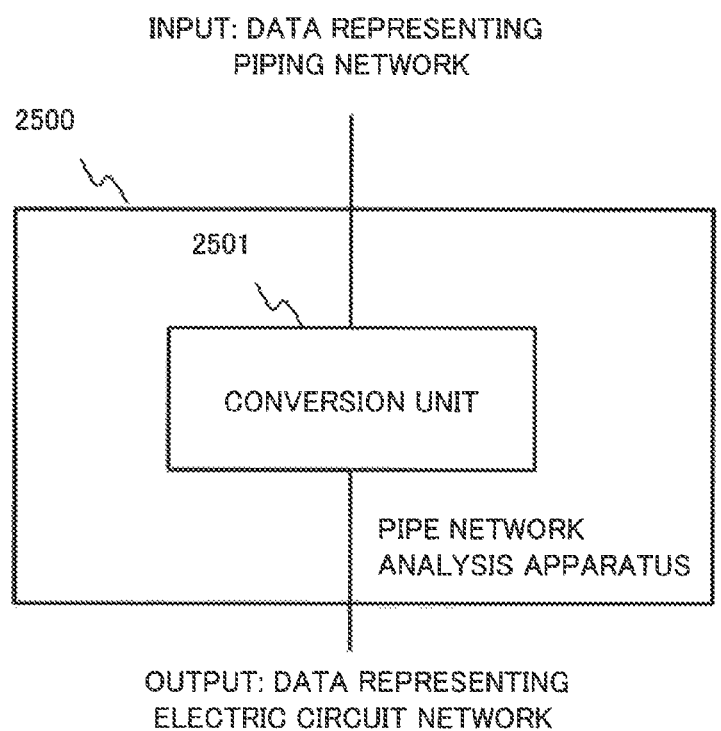
FIG. 25A is a block diagram exemplarily illustrating a functional configuration of a pipe network analysis apparatus in a second example embodiment of the present invention.

Next, a second example embodiment of the present invention will be described with reference to FIG. 25A. FIG. 25A is a block diagram exemplarily illustrating a functional configuration of a pipe network analysis apparatus 2500 in the present example embodiment.

As illustrated in FIG. 25A, the pipe network analysis apparatus 2500 in the present example embodiment includes a conversion unit 2501.

The conversion unit 2501 represents at least one piping elements constituting a pipe network that transports fluid, by use of elements of an electric circuit capable of expressing a non-linear relation between a pressure and a flow rate of the fluid in the piping elements. Thereby, the conversion unit 2501 generates a model representing an electric circuit network expressing the pipe network.

The conversion unit 2501 may receive, for example, data (model data of a pipe network) representing the pipe network that transports the fluid as input data.

The conversion unit 2501 may generate, as a model representing the electric circuit network capable of expressing the pipe network, for example, an electric circuit model which can be analyzed by use of a specific electric circuit simulator. In this case, when the electric circuit model generated by the conversion unit 2501 is analyzed by the electric circuit simulator, it is possible to analyze a state of the fluid in the pipe network that transports the fluid.

According to the pipe network analysis apparatus 2500 in the present example embodiment configured as described above, a pipe network that transports fluid is represented by use of an electric circuit network in accordance with characteristics of the fluid. Thereby, the pipe network analysis apparatus 2500 can analyze the pipe network using a technique for analyzing an electric circuit network. The reason is that the pipe network analysis apparatus 2500 generates, in accordance with characteristics of fluid in elements constituting a pipe network, an electric circuit model representing the elements of the pipe network by use of elements of the electric circuit capable of expressing the characteristics.

[Modified Examples of Second Example Embodiment]

Figure 25B:
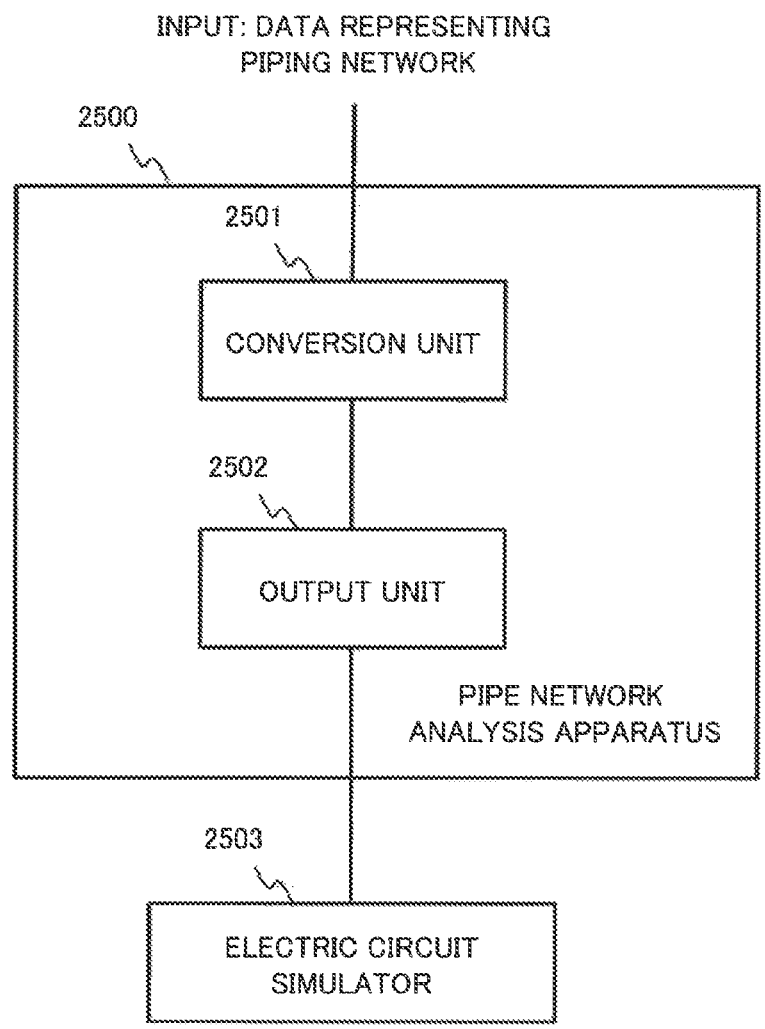
FIG. 25B is a block diagram exemplarily illustrating another functional configuration of the pipe network analysis apparatus in the second example embodiment of the present invention.
Figure 25C:
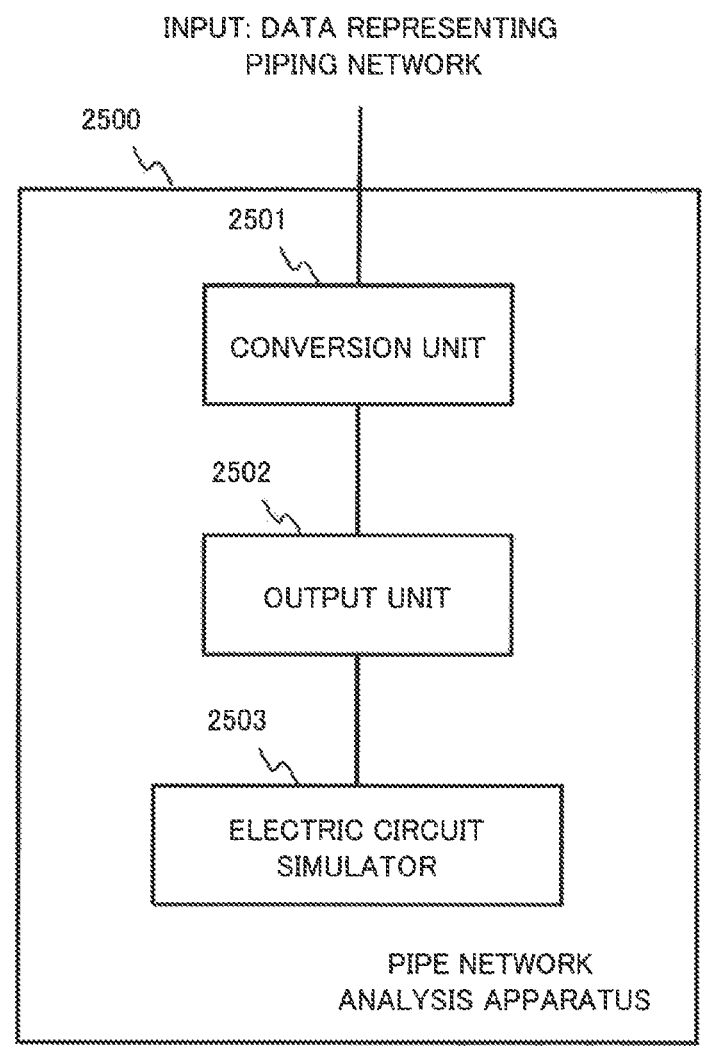
FIG. 25C is a block diagram exemplarily illustrating still another functional configuration of the pipe network analysis apparatus in the second example embodiment of the present invention.

Modified examples of the second example embodiment will be described below. The pipe network analysis apparatus 2500 in the second example embodiment may further include an output unit 2502 as exemplarily illustrated in FIG. 25B. In this case, the pipe network analysis apparatus 2500 and an electric circuit simulator 2503 are communicably connected using any communication method. Further, the pipe network analysis apparatus 2500 in the second example embodiment may further include an electric circuit simulator 2503 as exemplarily illustrated in FIG. 25C.

The output unit 2502 provides an electric circuit model generated in the conversion unit 2501 for the electric circuit simulator 2503. The output unit may be configured, for example, similar to the output unit 903 in the first example embodiment.

The electric circuit simulator 2503 analyzes the electric circuit model provided from the output unit 2502. The electric circuit simulator 2503 may be configured similar to the electric circuit simulator 906 in the first example embodiment.

The pipe network analysis apparatus 2500 configured as described above provides the same advantageous effect as the pipe network analysis apparatus 2500 in the second example embodiment.

<Configurations of Hardware and Software Program (Computer Program)>

A hardware configuration enable to realize the example embodiments described above will be described below.

In the following description, the pipe network analysis apparatuses (900, 2500) described in the example embodiments may be referred to simply as an "analysis apparatus". Further, the components (e.g. the input analysis unit (901), the conversion units (902, 2501), and the output unit (903)) of the analysis apparatus may be referred to simply as "components of an analysis apparatus."

The analysis apparatus described in the example embodiments may be realized by use of a dedicated hardware apparatus. In this case, the components illustrated in the drawings may be realized as hardware (an integrated circuit implemented with a processing logic, or the like) in which a part or all of the components are integrated.

For example, when the components are realized by hardware, the components may be implemented by integrated circuits, using an SoC (System on a Chip) or the like, able to provide respective functions. In this case, for example, data allocated in the components may be stored on a RAM (Random Access Memory) area or a flash memory area integrated as the SoC.

In addition, in this case, a well-known communication bus may be applied as a communication line for connecting the components. The communication line for connecting the components is not limited to bus connection. The components may be connected by Peer-to-Peer.

Figure 26:
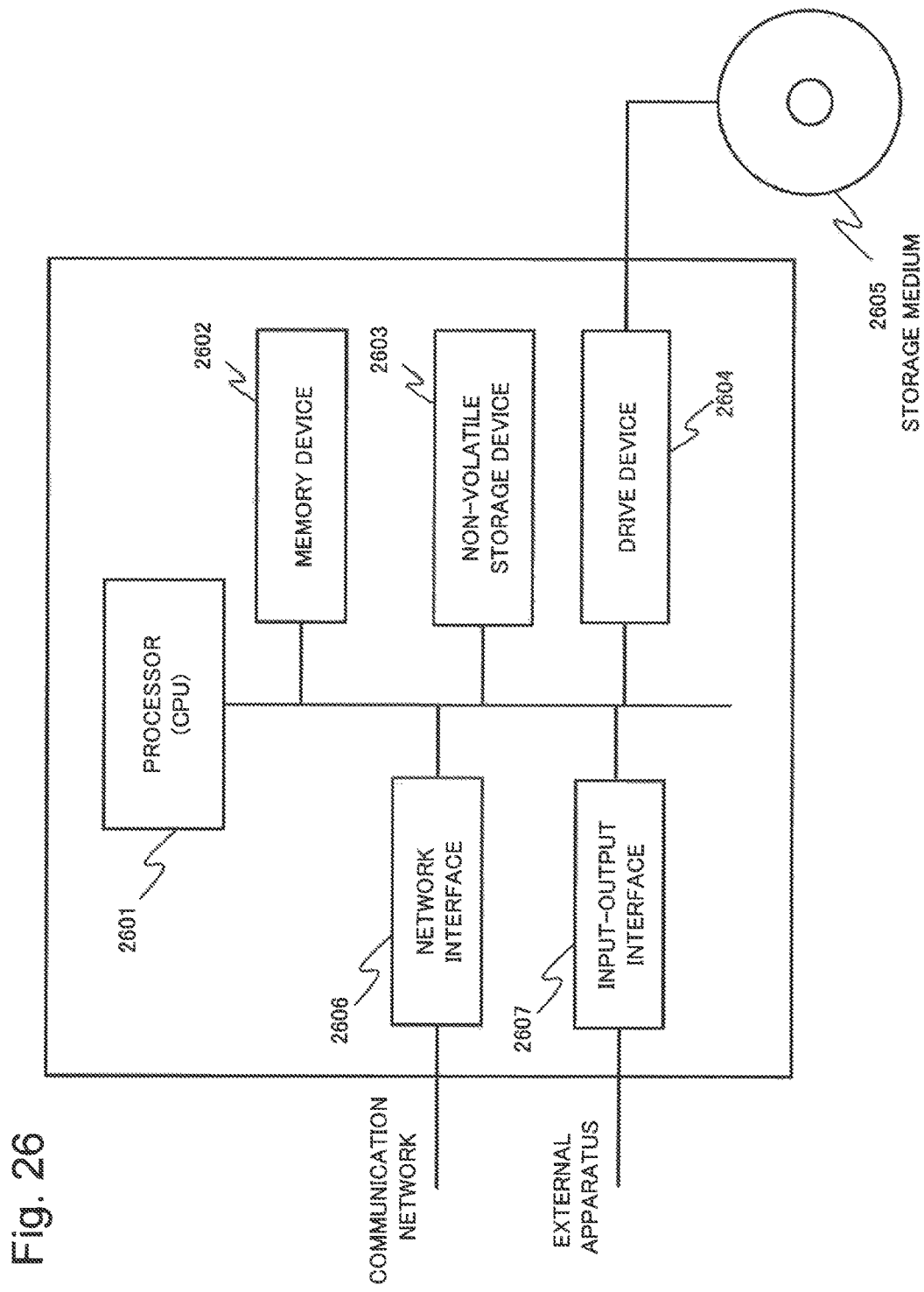
FIG. 26 is a block diagram exemplarily illustrating a hardware configuration able to represent the pipe network analysis apparatus in each example embodiment of the present invention.

Further, the analysis apparatus or the components of the analysis apparatus may be configured using hardware as exemplarily illustrated in FIG. 26 and various types of software programs (computer programs) executed by the hardware.

A processor 2601 in FIG. 26 is an processing device such as a general-purpose CPU, a microprocessor, and the like. For example, the processor 2601 may load various types of software programs stored on a non-volatile storage device 2603 to be described later onto a memory device 2602, and execute processing in accordance with the software programs. The analysis apparatus in the example embodiments may execute various types of operational processing using the processor 2601.

The memory device 2602 is a memory such as a RAM and the like that can be referred to from the processor 2601 and stores a software program and various types of data. The memory device 2602 may be constituted by volatile memory device.

The non-volatile storage device 2603 is a non-volatile storage such as a magnetic disk drive or a semiconductor storage device based on a flash memory, for example. The non-volatile storage device 2603 is able to store various types of software programs, data, and the like. Conversion information that associates elements of a pipe network with elements of an electric circuit network representing the elements of the pipe network may be stored on the non-volatile storage device 2603 in a format such as a file, a database, and the like.

A network interface 2606 is an interface apparatus for connection to a communication network, and, for example, an interface apparatus or the like for connection to a wired or wireless LAN (Local Area Network) is employable. The input analysis unit 901 in the first example embodiment may receive the pipe network model 904 from another unillustrated system or the like via the network interface 2606.

A drive device 2604 is a device that executes, for example, read and write of data from and to a storage medium 2605 described later.

The storage medium 2605 is any recording medium such as an optical disk, a magneto-optical disk, a semiconductor flash memory, and the like that can record data, for example.

An input-output interface 2607 is an apparatus that controls input output from/to an external apparatus. The user of the analysis apparatus may input, for example, the pipe network model 904 or instructions for various types of operations or the like to the analysis apparatus, with various types of input-output apparatuses (e.g. a keyboard, a mouse, a display apparatus, and a printer) connected via the input-output interface. The user interface 907 in the first example embodiment may be realized using various types of input-output apparatuses connected to the input-output interface 2607.

The present invention described using the above-described example embodiments as examples may be realized by configuring an analysis apparatus using, for example, the hardware apparatus exemplarily illustrated in FIG. 26 and supplying, to the hardware apparatus, software programs that can realize the functions described in the example embodiments. In this case, the present invention may be realized by executing the software programs supplied to the apparatus, by the processor 2601.

The units illustrated in the figures (e.g. FIG. 9 and FIG. 25A to FIG. 25C) in the above-described example embodiments can be realized as software modules, which are function (processing) units of the software programs executed by the above-described hardware. However, dividing of the software modules illustrated in these drawings is a configuration for convenience of description. Various configurations may be applied in implementation.

When, for example, the units exemplarily illustrated in FIG. 9 and FIG. 25A to FIG. 25C are realized as software modules, a configuration in which these software modules are previously stored on the non-volatile storage device 2603. Then, when the processor 2601 executes each processing, the software module may be load onto the memory device 2602.

In addition, the software modules may be configured to mutually transmit various types of data by an appropriate method such as a shared memory, inter-process communication, and the like. Using such a configuration, the software modules can be connected in a mutually communicable manner.

The software programs may be stored on the storage medium 2605. In a shipment stage or an operation stage of the communication apparatus and the like, the software programs may be stored on the non-volatile storage device 2603 appropriately through the drive device 2604.

In the above-described case, a method for installation into the apparatus using an appropriate tool in a production stage before shipment, a maintenance stage after shipment, or the like is applied as a supply method of various types of software programs to the analysis apparatus. As a supply method of various types of software programs, currently used method in general, such as downloading from the outside via a communication line such as the Internet and the like, can be applied.

In such a case, it is considered that the present invention includes codes configuring the software programs or a computer-readable storage medium storing the codes.

Further, the above-described analysis apparatus or components of the analysis apparatus may include a virtual environment where the hardware apparatus exemplarily illustrated in FIG. 26 is virtualized, and various types of software programs (computer programs) executed in the virtual environment. In this case, the components of the hardware apparatus exemplarily illustrated in FIG. 26 are provided as virtual devices in the virtual environment. Also in this case, the present invention can be realized by the same configuration as in the case where the hardware apparatus exemplarily illustrated in FIG. 26 is configured as a physical apparatus.

The present invention has been described as examples in which the present invention is applied to the above-described typical example embodiments. However, the technical scope of the present invention is not limited to the scopes described in the above-described example embodiments. It is apparent to those skilled in the art that the example embodiments can be subjected to various modifications and improvements. In such cases, new example embodiments obtained by adding the modifications or improvements can be also included in the technical scope of the present invention. Further, example embodiments in which the above-described example embodiments and the new example embodiment obtained by adding the modifications or improvements are combined can be also included in the technical scope of the present invention. This is apparent from the matters described in claims.

This application is based upon and claims the benefit of priority from Japanese patent application No. 2014-220312, filed on Oct. 29, 2014, the disclosure of which is incorporated herein in its entirety by reference.

REFERENCE SIGNS LIST

900 Pipe network analysis apparatus
901 Input analysis unit
902 Conversion unit
903 Output unit
904 Pipe network model
905 Electric circuit model
906 Electric circuit simulator
907 User interface
2500 Pipe network analysis apparatus
2501 Conversion unit
2601 Processor
2602 Memory device
2603 Non-volatile storage device
2604 Drive device
2605 Storage medium
2606 Network interface
2607 Input-output interface

The invention claimed is:

1. A pipe network analysis apparatus comprising:
a processor; and
a memory coupled to the processor, the memory storing instructions that when executed by the processor cause the processor to:
receive a pipe network model that represents a pipe network that transports a fluid, the pipe network being constituted by one or more piping elements,
convert at least one piping element of the piping elements to an electric element of an electric circuit, the electric element being configured to represent a non-linear relation between a pressure and a flow rate of the fluid in the piping elements by use of a relation between a voltage and a current,
generate a model representing an electric circuit network expressing the pipe network, by use of the electric element, and
provide the generated model to an electric circuit simulator to analyze a state of the pipe network.

2. The pipe network analysis apparatus according to claim 1, wherein the instructions further cause the processor to convert a specific piping element among the piping elements to an electric element of the electric circuit including a non-linear electric element that is configured to represent the relation between the pressure and the flow rate of the fluid in the specific piping element as a non-linear relation between a voltage and a current in the non-linear electric element.

3. The pipe network analysis apparatus according to claim 2, wherein
a relation equation expressing the relation between the pressure and the flow rate in the specific piping element is assigned to the non-linear electric element, and
the non-linear electric element is configured to:
change non-linearly the voltage in the non-linear electric element in accordance with a current flowing in a specific portion in the electric circuit network expressing the pipe network based on the relation equation, or
change non-linearly the current flowing in the non-linear electric element in accordance with a voltage in a specific portion in the electric circuit network expressing the pipe network based on the relation equation.

4. The pipe network analysis apparatus according to claim 3, wherein the non-linear electric element is a non-linear resistance that changes resistance value non-linearly depending on at least one of the current and the voltage in the non-linear electric element.

5. The pipe network analysis apparatus according to claim 3, wherein the non-linear electric element is a voltage source that non-linearly changes an output voltage in accordance with the current flowing in the specific portion of the electric circuit network expressing the pipe network.

6. The pipe network analysis apparatus according to claim 3, wherein the non-linear electric element is a current source that non-linearly changes an output current in accordance with the voltage in the specific portion of the electric circuit network expressing the pipe network.

7. The pipe network analysis apparatus according to claim 2, wherein, when the piping element is a fluid pipe, the the instructions further cause the processor to convert the fluid pipe to an electric element of the electric circuit that includes at least an inductance element, a capacitance element, and a non-linear electric element.

8. The pipe network analysis apparatus according to claim 7, wherein the instructions further cause the processor to convert the fluid pipe to an electric element of the electric circuit, the electric element being a ladder circuit being constituted by one or more of the electric circuits being connected for each specific length of the fluid pipe, the electric circuit including at least an inductance element, a capacitance element, and a non-linear electric element.

9. The pipe network analysis apparatus according to claim 7, wherein the electric element of the electric circuit representing the fluid pipe further includes a first resistance connected to the inductance element in series and a second resistance connected to the capacitance element in parallel.

10. The pipe network analysis apparatus according to claim 2, wherein
when the piping element is a valve that controls a flow rate of the fluid, the instructions further cause the processor to convert the valve to an electric element of the electric circuit including at least a resistance and a non-linear electric element,
the non-linear electric element being a voltage source that non-linearly changes an output voltage from the non-linear electric element in accordance with at least one of the voltage and the current in the non-linear electric element and at least one of the voltage and the current in the specific portion of the electric circuit network expressing the pipe network.

11. The pipe network analysis apparatus according to claim 2, wherein
when the piping element is a surge tank which is able to store the fluid up to a predetermined capacity, and which causes an overflow when the stored fluid exceeds the predetermined capacity, the instructions further cause the processor to convert the surge tank as an electric element of the electric circuit including at least a capacitance element and a non-linear electric element connected to the capacitance element in parallel,
the non-linear electric element being a current source that non-linearly changes an output current from the non-linear electric element in accordance with a difference between a specific voltage and a voltage in the capacitance element when the voltage in the capacitance element exceeds the specific voltage.

12. The pipe network analysis apparatus according to claim 2, wherein
when the piping element is a pump that transports the fluid, the instruction further cause the processor to convert the pump to an electric element of the electric circuit including at least a non-linear electric element,
the non-linear electric element being a voltage source that non-linearly changes an output voltage from the non-linear electric element in accordance with a current flowing in the non-linear electric element.

13. The pipe network analysis apparatus according to of claim 2, wherein
when the piping element is a tank that stores the fluid, the instructions further cause the processor to convert the tank to an electric element of the electric circuit including at least a capacitance element and a non-linear electric element connected to the capacitance element in series,
the non-linear electric element being a current source being configured to:
control not to output a current in a direction for charging the capacitance element, when a voltage in the capacitance element exceeds a specific upper-limit voltage and control not to output a current in a direction for discharging the capacitance element, when a voltage in the capacitance element falls below a specific lower-limit voltage.

14. The pipe network analysis apparatus according to of claim 1, wherein
the memory stores conversion information that associates the at least one piping element of the pipe network with the electric element of the electric circuit network, and
the instructions further cause the processor to convert the at least one piping element of the pipe network to the electric element of the electric circuit based on the conversion information.

15. A pipe network analysis method comprising:
receiving a pipe network model that represents a pipe network that transports fluid, the pipe network being constituted by one or more piping elements;
converting at least one piping element of the piping elements to an electric element of an electric circuit, the electric element being configured to represent a non-linear relation between a pressure and a flow rate of the fluid in the piping elements by use of a relation between a voltage and a current;
generating a model representing an electric circuit network expressing the pipe network, by use of the electric element; and
providing the generated model to an electric circuit simulator to analyze a state of the pipe network.

16. A non-transitory computer-readable storage medium recording a computer program that causes a computer to execute:
processing for receiving a pipe network model that represents a pipe network that transports fluid, the pipe network being constituted by one or more piping elements;
processing for converting at least one piping element of the piping elements to an electric element of an electric circuit, the electric element being configured to represent a non-linear relation between a pressure and a flow rate of the fluid in the piping elements by use of a relation between a voltage and a current;
processing for generating a model representing an electric circuit network expressing the pipe network, by use of the electric element; and
processing for providing the generated model to an electric circuit simulator to analyze a state of the pipe network.

* * * * *